United States Patent [19]

Ulrich

[11] 4,087,159

[45] May 2, 1978

[54] SELF IMAGING SYSTEM USING A WAVEGUIDE

[75] Inventor: Reinhard Ulrich, Leonberg-Silberberg, Germany

[73] Assignee: Max-Planck-Gesellschaft zur Forderung der Wissenschaften e.V., Gottingen, Germany

[21] Appl. No.: 615,115

[22] Filed: Sep. 19, 1975

[30] Foreign Application Priority Data

Sep. 20, 1974 Germany .............................. 2445150
Feb. 14, 1975 Germany .............................. 2506272
Mar. 13, 1975 Germany .............................. 2511046

[51] Int. Cl.² .......................... G02B 5/14; G02B 5/16; G02B 5/17
[52] U.S. Cl. .................................. 350/96.12; 350/96.24
[58] Field of Search .............. 350/96 WG, 96 C, 96 T

[56] References Cited

U.S. PATENT DOCUMENTS 3,489,481  1/1970  Osterberg et al. ............ 350/96 WG
3,832,029  8/1974  Bryngdahl ...................... 350/96 T

OTHER PUBLICATIONS

Bryngdahl "Image Formation Using Self-Imaging Techniques" J. of Optical Soc. of Amer., vol. 63, No. 4, Apr. 1973.

Primary Examiner—John K. Corbin
Assistant Examiner—Stewart Levy
Attorney, Agent, or Firm—Brisebois & Kruger

[57] ABSTRACT

The present invention is concerned with an imaging system for the self-imaging of objects, using optical waveguides comprising reflecting boundary surfaces, and satisfying the imaging condition $L\lambda = 4hN_\mu W^2_{eq}$ wherein L is the axial distance between the object and the self-image, $W_{eq}$ is a typical transverse dimension of the waveguide having an effective refractive index $N_\mu$, and $\lambda$ is the operational wavelength, and $h$ is an integer for single imaging and not an integer for multiple imaging.

Many embodiments of dielectric thin film waveguides are described which have the purpose of self-imaging very small objects with good levels of resolution. Magnification or reduction by means of the imaging system are also provided for.

47 Claims, 65 Drawing Figures

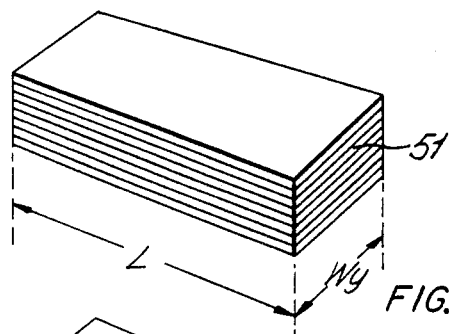
FIG. 4a
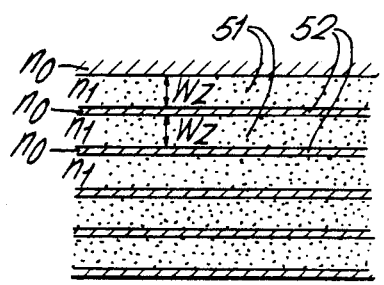
FIG. 4b
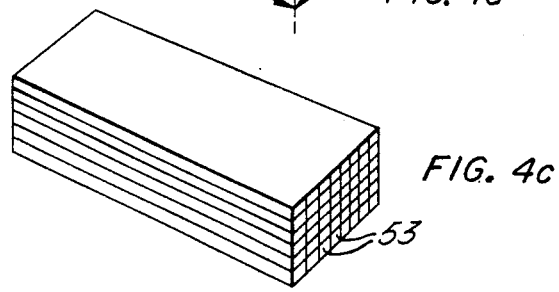
FIG. 4c
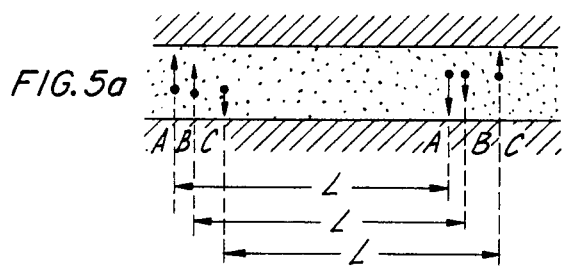
FIG. 5a
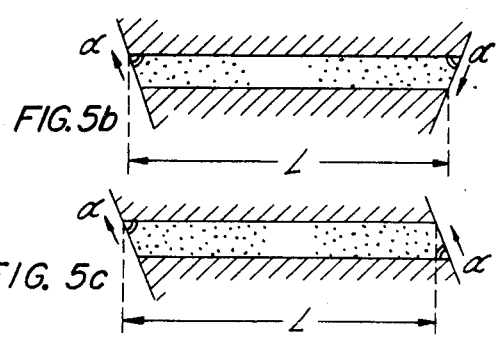
FIG. 5b
FIG. 5c
FIG. 5d

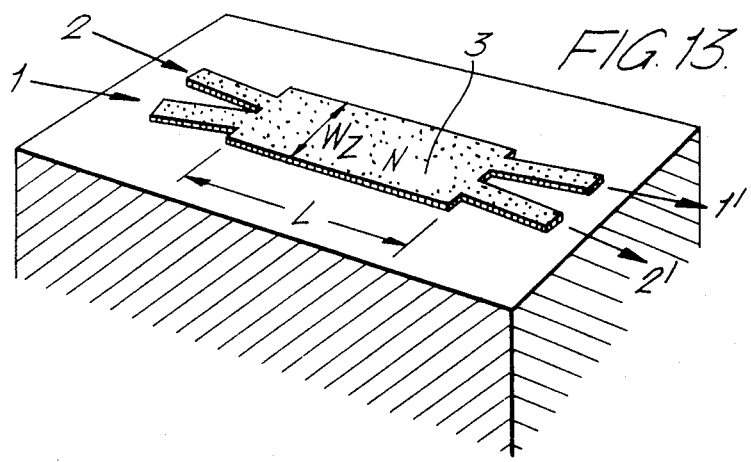
FIG. 13.
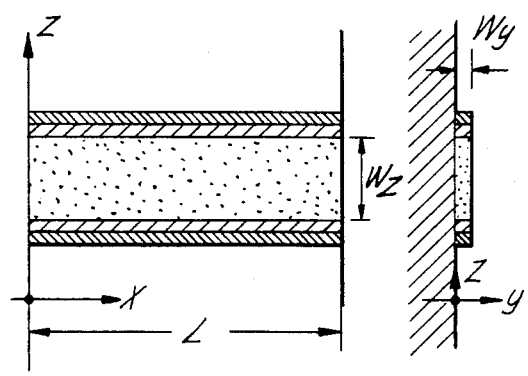 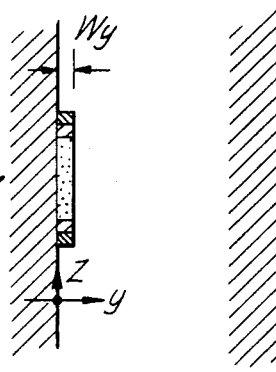 
FIG. 14a  FIG. 14b  FIG. 14c
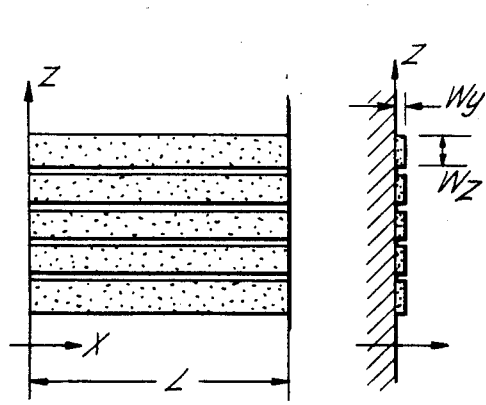 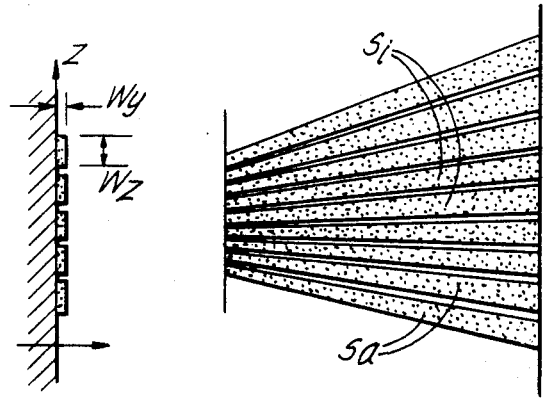
FIG. 15a  FIG. 15b

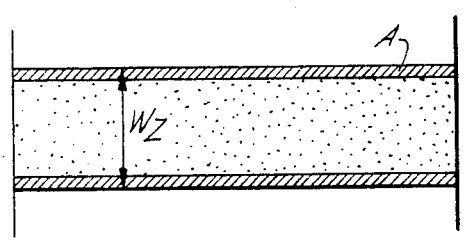
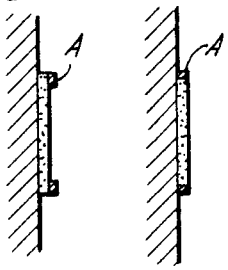
FIG. 16a  FIG. 16b
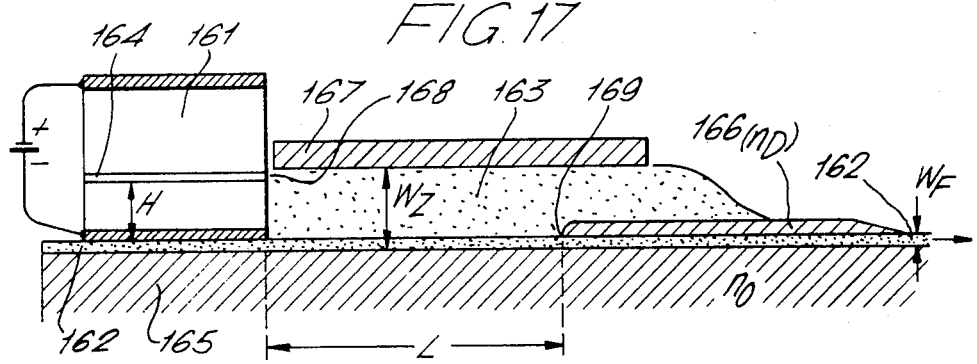
FIG. 17
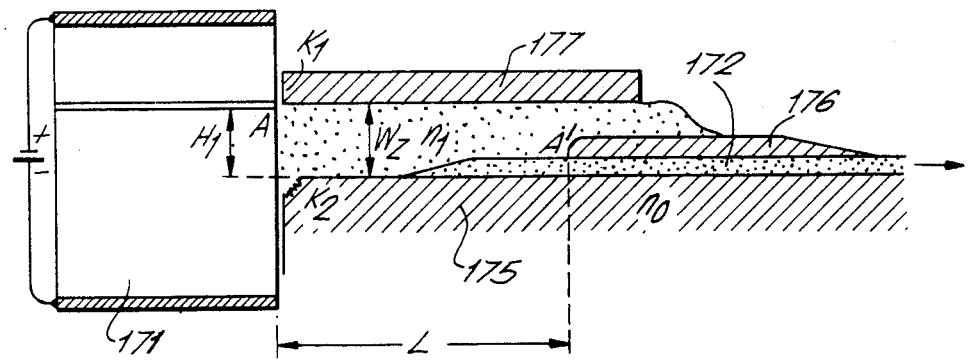
FIG. 18

SELF IMAGING SYSTEM USING A WAVEGUIDE

The invention relates to an imaging system for the self imaging of an object having a waveguide with reflecting boundary surfaces, wherein the distance L between the object and the image along the axis of the waveguide, at least one quantity $W_{eq}$ representing a typical transverse dimension of the waveguide taking into account the refractive index of the waveguide material or an effective index of refraction $N_\mu$, and the wavelength $\lambda$, satisfy at least approximately the imaging condition $$L \lambda = 4hN_\mu W_{eq}^2$$

wherein $h$ in the case of single imaging is an integer and in the case of multiple imaging is not integral.

In particular, in miniaturizing optical components in the form of the well known "Integrated Optics" (see, for example "Scientific American" April 1974 pages 28–35) the problem frequently arises of imaging the smallest objects. For example, the object may be the light exit surface of a Ga-AS laser (typical dimensions 0.5μm × 10μm) which is to be imaged upon the end face of an adjacent, e.g., spaced by 0.1 to 1.0 mm, optical film wave guide of the integrated optics type. By means of such imaging the laser light can be coupled into the fibres. Conventional imaging systems having lenses and mirrors can hardly be considered for such imaging because of the difficulties of producing lenses or mirrors with the necessary small dimensions and tolerances.

From the periodical "Applied Optics" No. 9 (1970) 753, an imaging system is known wherein dielectric optical waveguides are employed for imaging having a parabolic refractive index contour in one or both directions transverse to the propagation direction of the light and which are referred to as self-focussing waveguides. A substantial technical difficulty in this imaging system is the production of the films or fibres, e.g. by diffusion to produce the necessary parabolic contour of the refractive index.

A self imaging system of the first mentioned type is disclosed in principle in U.S. Pat. No. 3,832,029, in which is described the manner in which, by means of an optical tunnel in the shape of a square parallelepiped of length L and the typical transverse thickness and width dimensions, a symmetrical object arranged at one end of the tunnel and illuminated with monochromatic light is sharply imaged at the other end of the tunnel. The known optical tunnel can be filled with a fluid or can even be a single optical fibre, and has the advantage that no optical elements such as lenses are necessary and that the tunnel can be simply produced because it may have plane walls or boundary surfaces.

The present invention provides a particularly advantageous imaging system in the field of integrated objects, which avoids various limitations to which the known self imaging system is subjected, for example in respect of the type of waveguide used and the rectangular cross section thereof. Furthermore the invention offers various practical examples of a self imaging system for advantageous use in various practical cases.

Such an imaging system may have a waveguide which is in the nature of a film, or having a polygonal cross section departing from a square. It will be appreciated that the cross-section of an elongated strip of film is effectively a rectangle having two very short sides.

In a preferred practical example the refractive index $n$ of the thin film waveguide material follows a general function $n = n(y)$ in the dimension $y$ normal to the plane of the film. The effective refractive index of the imaging condition is then equated over a limited film width corresponding to the quantity $W_{eq}$ to an effective refractive index $N_\mu = c/v_\mu$ determined by the phase velocity of $v_\mu$ of a mode in which the imaging is to be effected, in which expression $c$ is the velocity of light in free space.

In the simplest case the waveguide can be in the form of a discrete thin film applied to a substrate by evaporation or cathode sputtering. However, the advantages of the self imaging system according to the invention are also achieved in a more general type of optical waveguide. Thus, thin film guides are already known which are produced in a suitable substrate by inward or outward diffusion of ions, or also by bombardment of the surface with fast ions (Applied Physics Letters 21 (1972) pages 72, 87 and 95, and Applied Physics Letters 22 (1973) page 326). In many of the more generally known thin film guides, the contour of the refractive index has an absolute maximum at the surface or in the immediate vicinity thereof (within a few wavelengths). The zone of a higher refractive index may however be more deeply situated (Applied Physics Letters 21 (1972) page 584). Furthermore the maximum value in the index contour $n(y)$ need not be absolute, because on the contrary a relative maximum is sufficient (J. Opt. Soc. Am. 65 (1975) page 46). It suffices to have a zone even of reduced refractive index provided that this zone is not too narrow and that the transition to a high index of the substrate is sharp (Applied Physics 1 (1973) page 55).

It is important for the purpose now being dealt with that in any case the thin film waveguide represents a homogeneous two-dimensional propagation medium for electromagnetic waves. The propagation should as far as possible be free of loss. However, small losses caused by absorption or reflection (in the case of so-called "leaky guides") do not disturb the self imaging procedure. The propagation always proceeds in certain spatial oscillation forms or "modes", which can be identified by the numbers $\mu = 0, 1, 2. \ldots$ Each mode has a definite phase velocity $v_\mu$, whose numerical value depends upon the particular index contour being considered. The "effective index" $N_\mu$ of a mode is then defined as $$N_\mu = c/v_\mu$$

wherein $c$ indicates the velocity of light in free space.

In accordance with the invention it is possible in a simple manner to produce from a film waveguide of the general type ($n = n(y)$) a self imaging thin film guide by cutting from the film a strip of width $W_z = W_{eq}$ according to the imaging condition, in which case the refractive index to be adopted must be the effective index $N_\mu$ of that mode, in which the self imaging must take place. This applies in general to only a single one of the modes, but in particular cases it could also apply in certain circumstances to a plurality of modes. Only by using the effective indexes $N_\mu$, which possess definite discrete values for a given index contour $n(y)$, is the known principle of the self imaging waveguide applicable to the general thin film guide. The usual refractive index of the film waveguide material is generally not applicable to waveguides of thin form, except in cases of a very thick film (several wavelengths thick), where $N_\mu$ becomes almost equal to $N_f$ for the lowest modes.

Another important point in the application of the self imaging principle to film waveguides in general is the technique of forming the "walls", which define the width $W_z$ of the ribbon guide. Lithographic methods are known for this purpose which employ light, electron beams or X-ray beams. Direct mechanical (or other) working of the thin film guide for reducing its width to the value $W_z$ is possible, but not necessary. On the contrary it is satisfactory if the film type waveguide is so modified that the effective index of refraction $N_\mu$ of the employed waveguide mode externally of the ribbon of width $W_z$ possesses a different value (usually a lower value) than it does within the ribbon. In the interest of obtaining a higher spatial resolution of the ribbon waveguide, the $N_\mu$ values inside and outside the ribbon should be as markedly different as possible so that within the strip waveguide a large number of possible modes exists. The modification of the refractive index $N_\mu$ can be effected, for example, by removing externally of the width $W_z$ a superficial layer of the ribbon waveguide, for example by etching. In such a case it suffices at least partially to remove the zone of higher refractive index $n(y)$ or in addition an adjacent zone of lower refractive index. Instead of effecting a removal of material externally of the width $W_z$ it is also possible by diffusion or implantation and the use of a suitable mask to restrict the formation of the film waveguide from the beginning to a ribbon of width $W_r$.

Furthermore the present invention provides a self imaging system of the first mentioned type which possesses a particularly good resolution capability. It is already known that the resolution is the better the greater is the number of modes which make a constructive contribution to the imaging, but there is a limit beyond which this does not apply. On the contrary, according to the invention the number of parallel node planes of the individual modes induced in the waveguide is to be limited to a value, which corresponds to the quotient of the transverse dimension $W_{eq}$ and the desired spatial resolution capability $(r)$ of the system, but which value is, nevertheless, substantially smaller than the number of parallel node planes of the highest possible modes.

Furthermore, according to the invention, there exists the possibility of improving the imaging properties by correcting any deviations of the modes from their ideal phase positions. According to the invention it is possible to provide the waveguides at their boundary surfaces with thin phase correcting layers of dielectric material and/or with partially reflecting absorbent metal layers, and/or to modify the cross section of the waveguide at its boundary surfaces for the purpose of mode correction by making these surfaces of barrel or cushion shape within an order of magnitude of the wavelength.

The invention furthermore opens up various possibilities of advantageous practical application of self imaging systems of the type here described. For example, it may be desired that the imaging system having a given level of resolution shall have a larger field of view than is achievable with a single waveguide of the thin film type or with a waveguide of rectangular cross section. In such a case according to the invention the waveguide may consist of a stack of a plurality of films or a bundle consisting of a plurality of waveguides of ribbon form with polygonal cross section, these being separated from each other by dielectric or metallic intermediate layers and having a thickness or width corresponding to the quantity $W_{eq}$.

According to the invention there is furthermore the possibility of simply providing a magnifying or reducing self imaging system by arranging that the transverse dimension of the waveguide corresponding to the path thereof progressively expands or contracts in the direction of propagation. In such a case a mean value of $W_{eq}$ is then to be inserted in the expression determining the imaging condition.

A thin film waveguide of a self imaging system according to the invention, which is particularly well suited for certain practical applications of integrated optics may have a thickness of the order of magnitude of only one wavelength of light and may combine two or more other thin film waveguides on the same substrate. Because in such a case only a few modes, or in the extreme case only a single mode, can exist in the thickness dimension, the effective index of refraction of the mode which is employed will again apply in the imaging condition.

According to the invention a self imaging waveguide of the thin film type can be utilised for coupling the radiation of a laser or optical amplifier into a given light guiding film, even though the active zone of the laser or the amplifier frequently cannot be brought into the same plane as the film. In such a case the invention provides that the waveguide of thin film shape together with a thin film light-guide of an integrated optical arrangement are arranged upon a common substrate and adjacent a laser or optical amplifier in such a manner that imaging of the end face of the thin film guide and the end face of the active zone of the laser or amplifier follow each other in alternate session. Similarly it is possible in accordance with the invention that for the purpose of coupling two thin film guides of an integrated optical arrangement situated upon a substrate, the waveguide is arranged between or upon the ends of both of the thin film guides and is so dimensioned that the ends of the waveguide are alternately imaged so that thereby an image of the ends thereof is formed between the thin film conductors at an interval from the substrate.

According to another example of applying the invention the waveguide may form the resonator of a laser.

A further possibility for the application of a self imaging system of the kind here described is the separation of two radiations of different wavelength. For this purpose in accordance with the invention the waveguide is arranged between a diaphragm which delivers the radiation of two given wavelengths and a dividing wall spatially separating the radiations from each other.

In the optical art there often arises the problem of splitting a light beam into several component beams or that of combining a number of light beams with each other. For this purpose beam dividers and directional couplers are used. The expression beam divider is to be understood as meaning a device for splitting a light beam into two or more component beams in such a manner that each of the component beams carries the same optical image as the incident beam. An example in conventional optics is a semi-transparent silvered mirror. On the other hand the expression directional coupler is understood to mean an element, as is employed, for example, in the microwave art, for coupling together two (or more) wave-guides, usually of single mode. Consequently a directional coupler can only divide or combine the power of light beams. It is not possible, however, to consider the transmission of an image through such a device, because an image consists necessarily of a plurality of image points, of which each one requires in principle one optical mode for transmission. A beam divider is therefore suitable for image-retaining division of light beams of different modes, but a directional coupler on the contrary is intended normally only for single mode operation. A beam divider may often assume the function of a directional coupler, but the reverse is not true. The beam dividers therefore form a more general group. The practical applications of beam dividers in integrated optics correspond approximately to those in conventional optics; branching off a component light beam in order to measure the intensity of the main beam, distribution of the light of a source to a plurality of leads, splitting of the light beam in interferometers (for example according to Michelson), coupling out from laser resonators, as well as the separation and superposition of the reference beam in the recording and reconstruction of holograms. The couplers and beam dividers which were formerly used in general involve substantial manufacturing difficulties on account of the necessarily high mechanical precision.

A self imaging system according to the invention can, when used as a beam divider, include as a waveguide a thin film conductor whose thickness is substantially greater than the wavelength, so that the image of a strip shaped inlet $w'$ at one end of the film type conductor is imaged at the other end upon each of a vertical series of strip shaped outlet windows. Instead of such an arrangement the waveguide can also be rectangular or may be a thin film guide, at whose opposite end faces there are arranged a number of optical ribbon guides of small width in adjacent relationship. An interesting possibility in such a beam divider is its employment as a linking member for bringing about logic functions (AND, OR and so on).

According to another practical form of the invention the beam dividing self imaging system may serve for dividing an image into symmetrical and antisymmetrical components, in which case the length of the thin film waveguide is selected for a half integral perameter $h$, and a device for phase delay of the light by 90° is provided upon an inlet window occupying the one half of the inlet surface of the waveguide.

Another important possibility of practical application of a beam dividing self imaging system of the type here described is its use as a modulator or image switch, or as an optical isolator. In such a case a number of input ribbon conductors are connected to the receiving end surface of a first waveguide of thin film, or ribbon or rectangular shape, and a corresponding number of output ribbon conductors are connected to the output end surface of a second waveguide of thin film, or ribbon or rectangular shape. Between the two waveguides there are situated in this case further ribbon conductors, which serve as phase shifters with the phase shifting separately variable by external influence, or which represent non- eciprocal optical elements.

Instead of performing a division of an input image into output images of equal intensity there is also the possibility of performing a non-uniform subdivision. According to the invention there is then provided a waveguide composed of at least three guide members, of which the first guide member receives the image at an inlet window, which is then imaged upon at least two output windows upon the adjacent second and third guide members connected to the first guide member, the widths of the guide members being related to each other in the proportion $(q' + q'') : q' : Q''$, wherein $Q'$ and $q''$ are whole numbers proportional to the desired intensities of the image at the two output windows, and the lengths of the guide members are so selected that their existing imaging perameters $h$, $h'$ and $h''$ satisfy the conditions $h=p(q'=q'')$, $h'=p'/q'$ and $h''=p''/q''$, wherein $p$, $p'$ and $p''$ are whole numbers. Finally there is also the possibility of providing a so-called star coupler by means of an imaging system serving as a beam divider or beam coupler. According to the invention for this purpose a number of glass fibres are applied with their end faces upon one end face of the prism or pyramid shaped waveguide, whose other end face is mirrored, which images the end face of each individual fibre upon all the other fibres.

The invention will now be explained in more detail. The accompanying drawings show the following:

Figure 6:
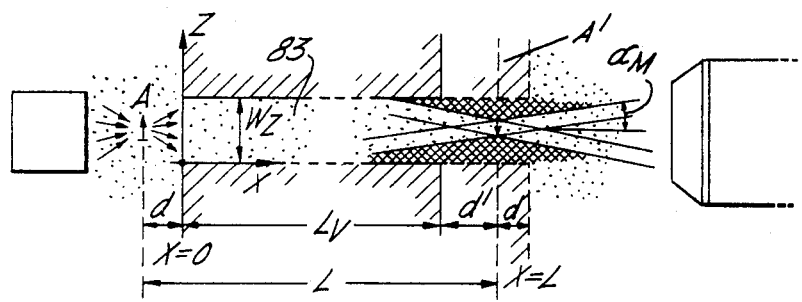
Figure 7:
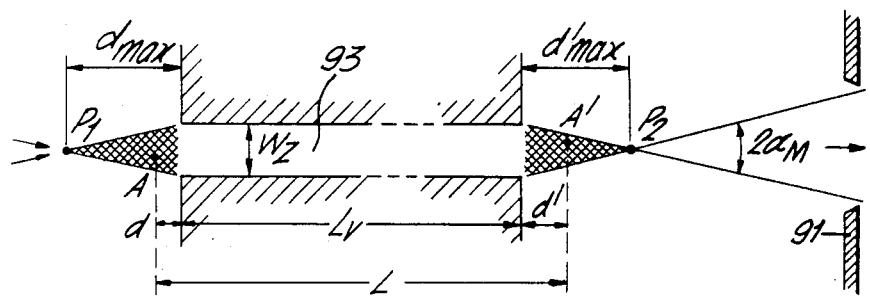
Figure 8:
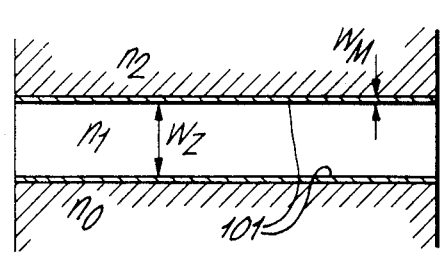
Figure 9:
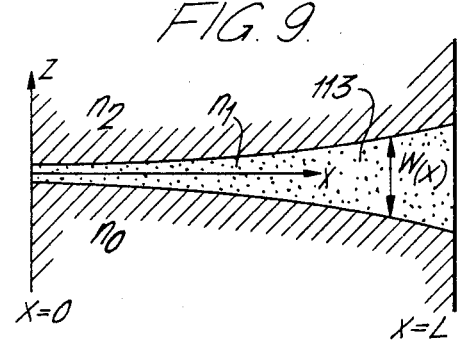
Figure 10:
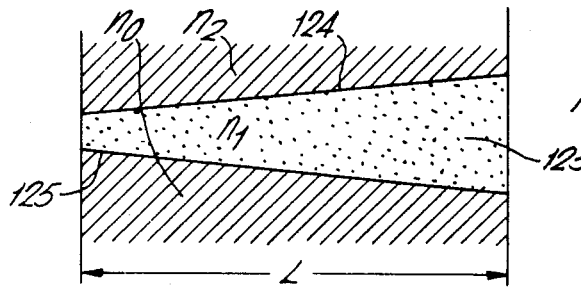
Figure 11:
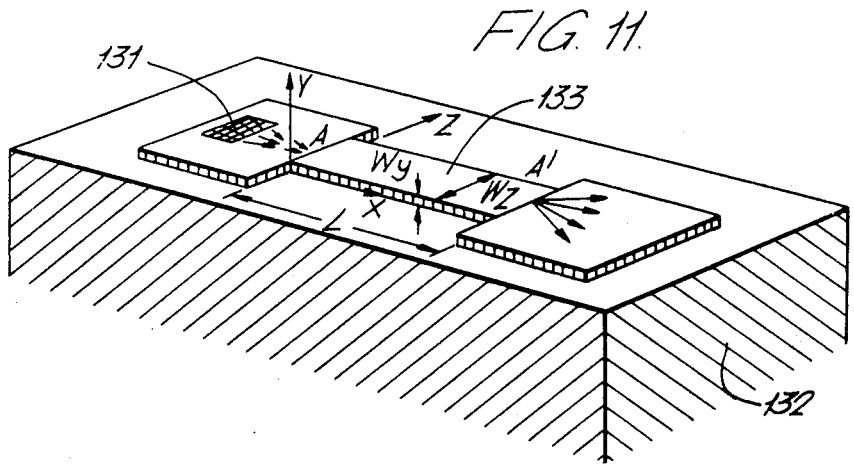
Figure 19:
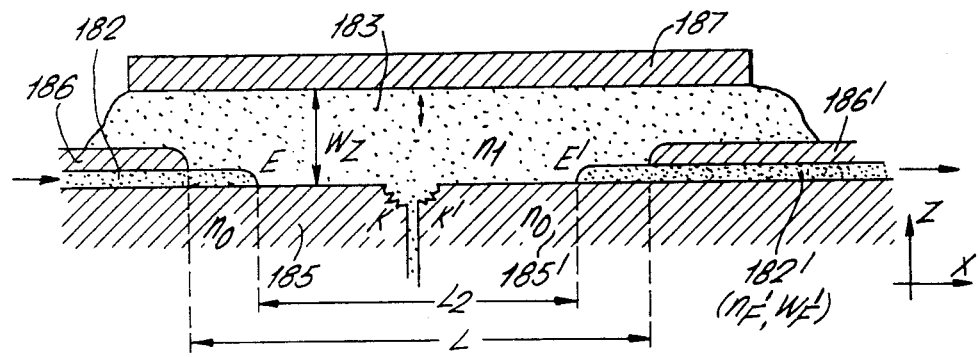
Figure 24:
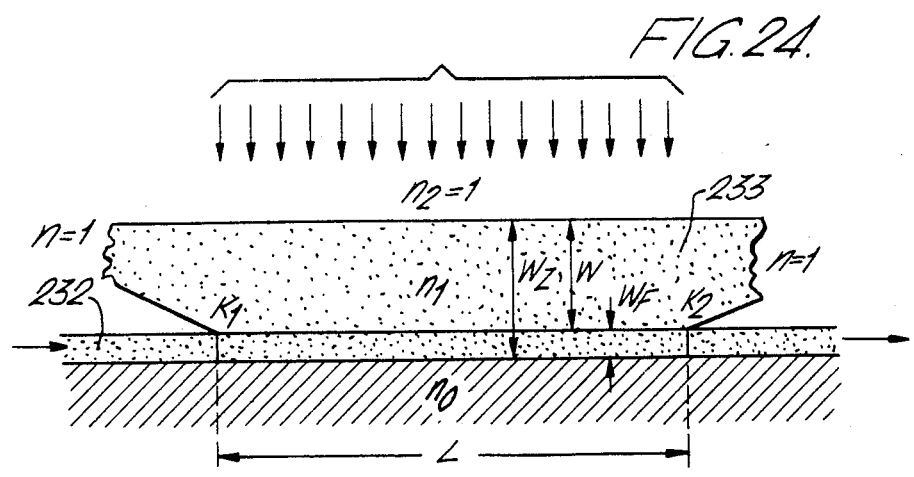
Figure 25:
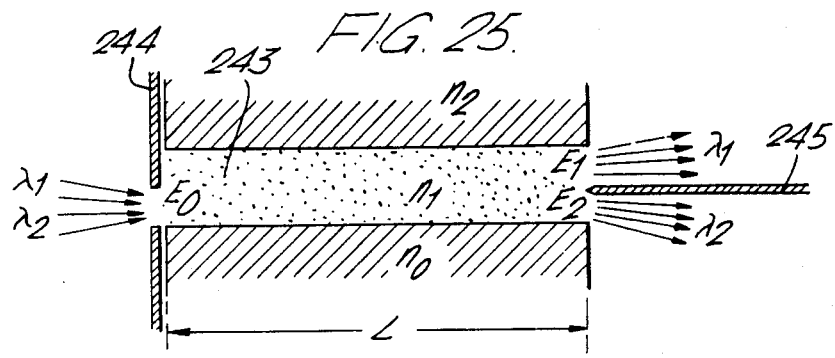
Figure 26:
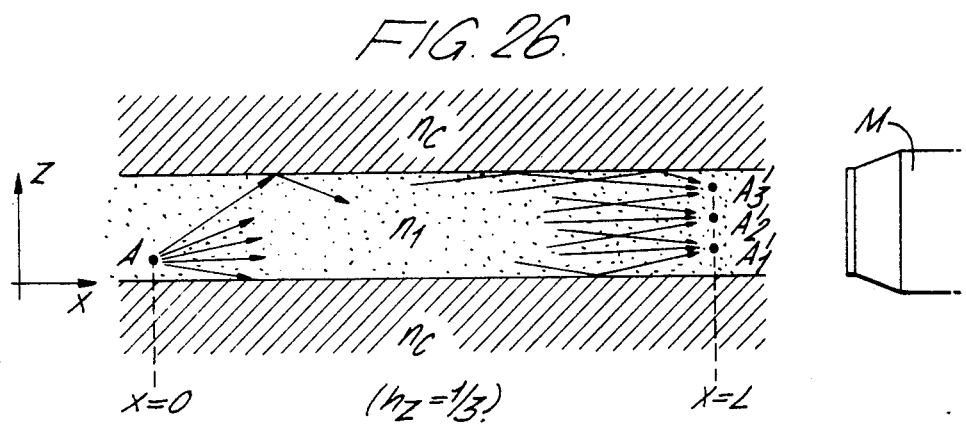
Figure 27:
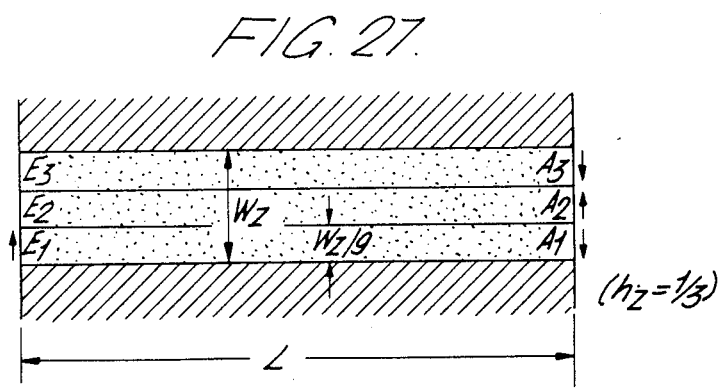
Figure 30:
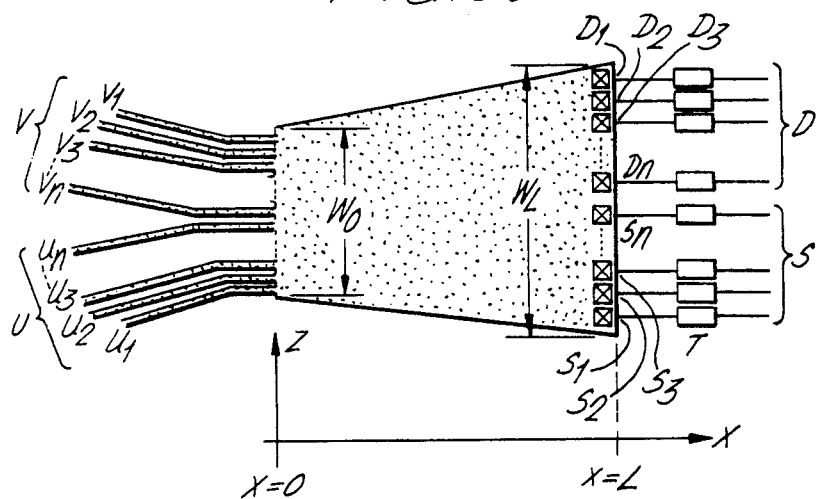
Figure 31A:
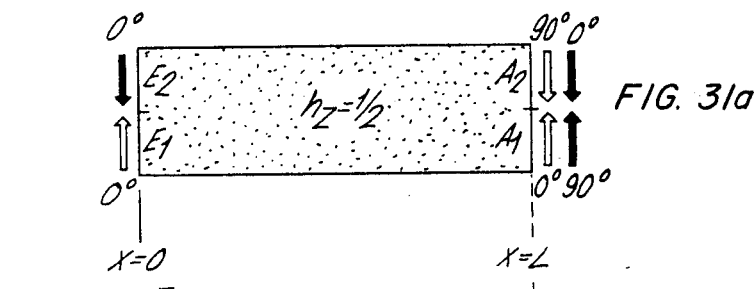
Figure 31B:
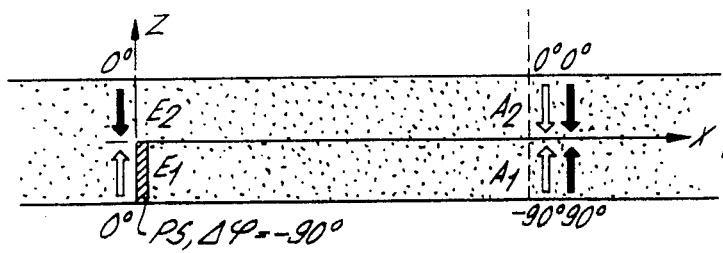
Figure 34:
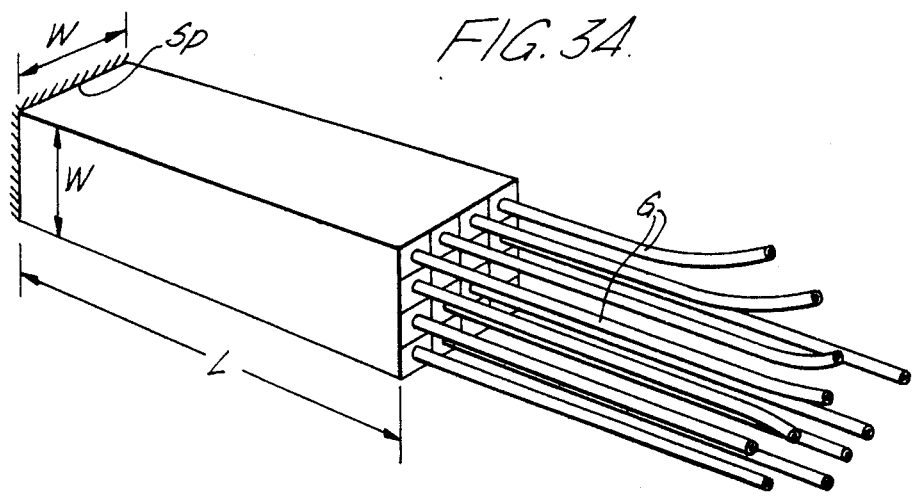
Figure 40:
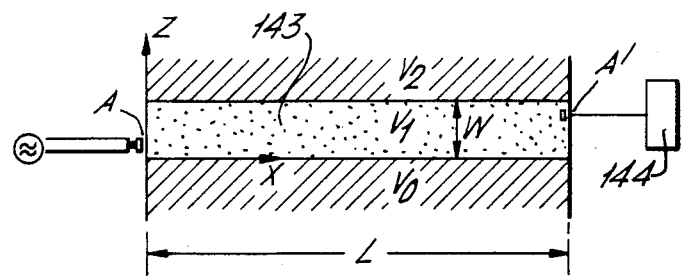

FIGS. 4a–c shows a waveguide composed of a stack or bundle of individual conductors;

FIGS. 5a–d shows waveguides with modified end surfaces;

FIG. 6 is an abbreviated imaging waveguide;

FIG. 7 is a diagram for demonstrating the maximum possible shortening of a waveguide;

FIG. 8 is a waveguide having metal films serving for apodization;

FIGS. 9 and 10 are waveguides with locally variable cross section;

FIG. 11 is an integrated optical arrangement with a waveguide;

FIGS. 12a–f shows various index profiles of an optical thin film guide for the self-imaging system;

FIG. 13 is a conductive crossing for integrated objects with an imaging system according to the invention;

FIGS. 14a–c shows various ribbon waveguides with the possibility for reducing image errors;

FIGS. 15a and 15b shows an imaging system with a large field of view;

FIGS. 16a and 16b show a ribbon type guide with facility for apodization;

FIGS. 17 and 18 are arrangements for coupling a laser to optical thin film guides;

FIG. 19 is an arrangement for coupling two thin film guides;

FIGS. 20 to 23 show various resonators obtained by the use of a waveguide;

FIG. 24 is an amplifier for the purposes of integrated optics;

FIG. 25 is a filter for separation of two different types of radiation;

FIGS. 26 and 27 show a longitudinal section through a dielectric thin film waveguide such as can be used in principle for beam division;

FIGS. 28a–c and FIGS. 29a–c shows thick and thin film type guides for beam division;

FIG. 30 shows an opto-electronic linking member constituted of a beam divider;

FIGS. 31a, 31b and 32 show waveguides comprising beam dividers for image analysis, or image modulation or switching;

FIG. 33 shows a beam divider for producing output images of unequal intensity;

FIG. 34 shows a beam divider serving as a star coupler;

FIGS. 35a-e shows various practical forms of waveguide with oblique or irregular end surfaces;

FIGS. 36 to 39 are representations of two-dimensional space groups for obtaining possible cross sectional forms of the waveguides according to the invention;

FIG. 40 shows an imaging acoustic waveguide.

Figure 1:
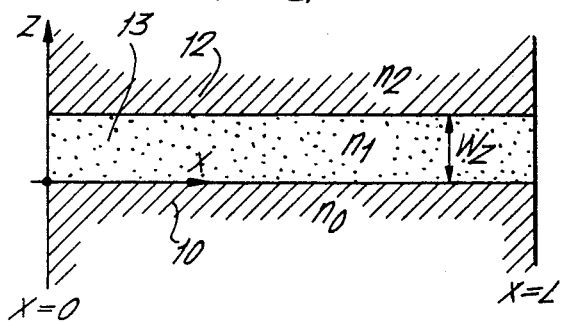
FIG. 1 is a cross section through a dielectric thin film waveguide.

The simplest imaging systems will first be described. FIG. 1 shows a cross section of a dielectric optical waveguide gf thin film shape with homogeneous refractive index, which is capable of achieving a uni-dimensional optical imaging of any desired object, in particular an asymmetrical object. The waveguide consists of an optical material 13 transparent for the wavelength $\lambda$ of light which is used having the refractive index $n_1$. The rectangular coordinate system of FIG. 1 is oriented with its x-direction parallel to the direction of propagation of the light. The direction normal to this within the plane of the drawing of FIG. 1 is called the z-direction, and the y-direction is normal to the plane of the drawing. The waveguide is limited in the x-direction by the two surfaces $x=0$ and $x=L$, and is limited in the z-direction by the two surfaces $z=0$ and $z=W_z$. The described surfaces should be optically plane as far as possible i.e. any deviations from the ideal plane should be small with respect to the wavelength $\lambda$ which is used. In the y-direction the dimension of the thin film guide can be very great as compared with the dimension $W_z$ of the film necessary for imaging, but this y-dimension may also be comparable with the latter (FIG. 2) and could also be very much smaller than $W_z$ and be within the order of magnitude of one wavelength (FIG. 13). In all three cases the self imaging is effected according to the same optical principle which will be explained in the following. This principle is most easily understood if the dimension in the y-direction is very great as compared with $W_z$. This case will therefore first be considered.

The film type waveguide according to FIG. 1 is covered at its upper side and lower side by two other optical material 10, 12 which are also transparent for the wavelength $\lambda$ and have the refractive indexes $n_0$ and $n_2$. Also included here within the expression "optical materials" is free space (vacuum), which is characterised by the refractive index $n=1$. In order that the light in the waveguide can be guided by total reflection, the refractive indexes $n_0$ and $n_2$ must both be smaller than the refractive index of the material of the waveguide, i.e. $n_0 < n_1$ and $n_2 < n_1$. If these conditions for total reflection are not satisfied the film type waveguide is "leaky" and the achievable quality of imaging can be somewhat impaired under these circumstances. The imaging property is however not completely lost. The materials 10 and 12 must be transparent and must have a dimension of about one or more wavelengths in the z-direction. In the case of metallic materials 10 and 12 smaller film thicknesses suffice, which however must be at least as much as will allow the boundary surfaces $n_1/n_0$ and $n_1/n_2$ to be reflecting.

The thin film waveguide represented in FIG. 1 effects a single or multiple unidirectional imaging of the region $0 < z < W_z$ of the entry plane $x=0$ onto the corresponding region $0 < z < W_z$ of the exit plane $X=L$. These regions of ribbon shape $0 < z < W_z$ therefore perform the function of entry pupil and exit pupil of the imaging system.

As will be shown the imaging is only sharp if the dimensions of the film type waveguide satisfy the condition $$L \cdot \lambda = 4 h_z n_1 W^2_{eq,z} \quad (1)$$

In this relationship $h_z = 1, 2, 3, 4 \ldots$ must be an integer, if the imaging is to be single, or must be a fraction number $h = p/q$ if multiple imaging is desired ($q$-fold, $q \neq 1$). The quantity $W_{eq,z}$ is an equivalent film thickness. This is the thickness of an optical thin film guide having ideal metallic reflecting walls, whose possible electromagnetic field distributions (modes) in the region $0 < z < W_z$ coincide with those of the given real thin film waveguide. On account of the so-called "Goos-Hahnchen" effect the equivalent thin film thickness in the case of the totally reflecting thin film guide ($n_0 < n_1$ and $n_2 < n_1$) is slightly greater than the geometrical thickness W of the actual thin film guide, and moreover depends to a very slight extent upon the polarisation of the imaging light. If the light is polarised with the electrical vector normal to the plane of the drawing of FIG. 1 (so-called TE-polarisation, then the following applies:

$$W_{eq,z} = W_z + (\lambda/2\pi)[(n_1^2 - n_0^2)^{-\frac{1}{2}} + (n_1^2 - n_2^2)^{-\frac{1}{2}}] \quad (2)$$

If, on the other hand, the light is polarised with the magnetic vector normal to the plane of the drawing of FIG. 1 (so-called TM-polarisation), then the following applies:

$$W_{eq,z} = W + (\lambda/2\pi n_1^2)[n_0^2(n_1^2 - n_0^2)^{-\frac{1}{2}} + n_2^2(n_1^2 - n_2^2)^{-\frac{1}{2}}] \quad (3)$$

In such cases, in which $n_0$ or $n_2$ is greater than $n_1$ it is always possible to calculate the film thickness from the equations (2) and (3) if the imaginary expressions appearing therein are simply cancelled.

For explanation of the one-dimensional imaging reference is again made to FIG. 1. The imaging scale of the film guide there shown is 1:1. The image projected from the entry plane $x=0$ onto the exit plane $x=W$ is upright, if $h_z$ in equation (1) is an even number. For the case where $h_z$ is an odd number the image is reversed.

The imaging is one-dimensional because the thin film guide confines the light only in the z-direction by reflections at the boundary surfaces $n_1/n_0$ and $n_1/n_2$. In the y-direction the side walls of the thin film guide are so far removed that the light practically never reaches them. Therefore in this direction there takes place no conduction and also no imaging. If there is an object situated in the entry plane $x=0$ and which is illuminated from the lefthand direction, the structure is imaged only along the z-direction. Structures of the object along the y-direction are not reproduced when the imaging is one-dimensional.

For the purpose of illustrating the equations (1)-(3) a thin film guide will be considered which consists, for example, of a fluid having the refractive index $n_1 = 1.500$, which is enclosed between two equally dimensioned polished plates of fused quartz, for which $n_0 = n_2 = 1.457$. Let the film thickness be $W_z = 50$ $\mu$m, and the wavelength of the imaging light $\lambda = 633$nm. From the equations (2) and (3) there is obtained the equivalent film thickness of this system as $W_{eq,z} = 50.70 \mu$m in a case of TE-polarisation and $W_{eq,z} = 50.66\mu m$ in the case of TM-polarisation. In the case of single imaging according to equation (1) ($h_z = 1$), the necessary length of the thin film guide is approximately $L = 24.4mm$ for TE-polarisation and is $L = 24.3mm$ in the case of TM-polarisation. These lengths are the shortest guide lengths which will make possible an imaging for the condition ($h_z = 1$). However, for each integral multiple of these lengths sharp images are always obtained.

To obtain a sharp image it is essential to have precise satisfaction of equation (1). For this reason one requires practically any sort of possibility of so varying one or more of the quantities contained in equation (1) that this equation is precisely satisfied. For example the film thickness W can be adjusted. Other possibilities for the sharp adjustment of the image consist in varying the refractive index $n_1$ of the film, for example by varying the temperature or by applying an electrical fluid. A further possibility is also the variation of the wavelength $\lambda$.

Figure 2:
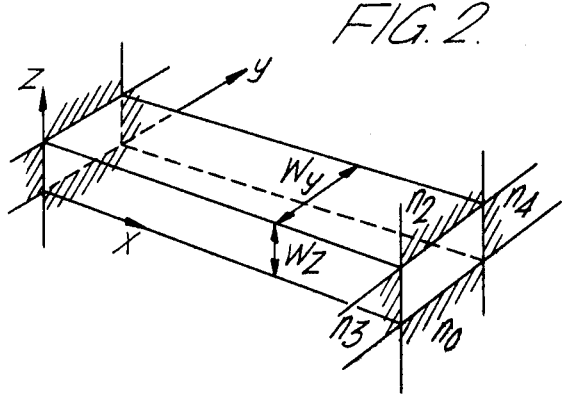
FIG. 2 is a dielectric waveguide of ribbon shape.

The above described principle of the thin film waveguide for wave guiding and imaging in the z-direction can obviously be applied simultaneously also to the y-direction. One then obtains an optical ribbon shaped guide of generally rectangular cross section, which will provide a two-dimensional imaging if there is correct choice of the dimensions. Such a dielectric ribbon waveguide is represented in FIG. 2. In the case of a thick rectangular ribbon type guide the guidance of the waves takes place in the y and z directions almost independently of each other. Consequently in order to achieve sharp imaging it is necessary to satisfy, in addition to equation (1) a further suitable imaging condition for the y-direction $$L\lambda = 4h_y n_1 W^2_{eq,y} \qquad (4)$$

The equivalent ribbon width $W_{eq,y}$ appearing herein is calculated in a manner analogous to that of equation (2) and (3) from the geometrical width $W_y$ of the ribbon. However, instead of $n_0$ and $n_2$ the refractive indexes $n_3$ and $n_4$ of the materials at both sides of the ribbon (FIG. 2) must be used.

The imaging process produces, in the case of integral values of $h_y$ and $h_z$, a single real image of the entry plane $x = 0$ in the exit plane $x = L$. The size of the image field is $W_y \times W_z$. The image is produced on the scale 1:1. The image is erect if $h_y$ and $h_z$ are both even numbers. Otherwise the image will be laterally reversed in one or in both coordinate directions. The simplest form of a two-dimensional imaging waveguide has a square cross section, i.e. $W_y = W_z$. In such a case the relationship $h_y = h_z$ will naturally also apply, and the image is either erect (if $h_y = h_z$ is an even number) or is inverted (in the case where $h_y = h_z$ is an odd number).

The imaging conditions according to equations (1)-(3) will now be derived theoretically as well as conclusions concerning the achievable resolution capability and the permissible tolerances of the waveguides. For the sake of simplicity there will now be considered in more detail only the one-dimensional imaging symmetrical thin film waveguide ($n_0 = n_2$).

It is known that the electromagnetic field in a thin film waveguide can be represented as a number of superimposed modes $$V(x,z) = \sum_m a_m F_m(z) \exp(i\beta_m x) \qquad (5)$$

In the case of TE-polarisation V represents the y-component of the electric field and in the case of TM-polarisation V represents the y-component of the magnetic field. The quantities $a_m$ are amplitude factors, $F_m(z)$ are the normalised real field distributions of the modes, and $\beta_m$ are propagation constants of the modes. A time factor $\exp(-i\omega t)$ is to be ascribed to all field quantities.

Let it be assumed that there is a certain field distribution $V_0(z)$ in the entry plane $x = 0$ of the thin film waveguide, that an object is brought into this plane and is illuminated from the lefthand direction with a polarised monochromatic light source. This field $V_0(z)$ sets up in the waveguide modes which are capable of propagation. The amplitudes of these modes are as follows:

$$a_m = \int V_0(z) F_m(z) \, dz. \qquad (6)$$

and they propagate, independently of each other, along the waveguide in accordance with equation (5). For the plane $x = L$ the following applies:

$$V(L,z) = \exp(i\beta_0 L) \sum_{m=0}^{M} a_m F_m(z) \exp[iL(\beta_m - \beta_0)] \qquad (7)$$

Accordingly it is here assumed that all the modes from $m = 0$ up to a maximum number of modes $m = M$ are excited and are capable of being propagated. From equation (8) it can be seen that an imaging of the plane $x = 0$ in the plane $x = L$ will take place in each case if the following applies simultaneously for all the modes which are excited $$\exp[iL(\beta_m - \beta_0)] = 1. \qquad (8)$$

Under this condition the fields of these modes interfere at $x = L$ in exactly the same manner as in the object plane $x = 0$. The factor $\exp(i\beta_0 L)$ common to all the modes in equation (7) is then meaningless (it expresses the time phase position of the image relative to the object). Under the condition of equation (8) the image is erect and has natural dimensions.

Before proving that equation (8) can be satisfied for a thin film waveguide it will be shown that the satisfaction of another set of conditions $$\exp[iL(\beta_m - \beta_0)] = (-1)^m \qquad (9)$$

by the established modes $m = 0 \ldots M$ produces an image, and in fact one which is reversed and of natural size. This follows from the symmetrical character of the modes of a thin film waveguide. In the normal representation of the $TE_m$ and $TM_m$ modes of a symmetrical thin film guide ($n_0 = n_2$) the fields $F_m(z)$ possessing even modenumbers $m$ have even symmetry with respect to the central plane of the film, and the fields with odd mode numbers $m$ have odd symmetry $$F_m(z) = (-1)^m F_m(W_z - z) \qquad (10)$$

By inserting this relationship in equation (7) it follows that under the condition of equation (9)

$$V(L,z) = V(o, W_z - z) \qquad (11)$$

applies, which indicates that there is inverted imaging.

The possibility of satisfying the conditions in equations (8) and (9) for a thin film waveguide with spatially constant refractive index $n_1$ is derived from its dispersion equation $$\kappa_m W_z = 2\phi_m + m\pi \qquad (12)$$

In this expression $m = 0,1,2\ldots$ is the mode number, which is identical with the number of parallel node planes of the mode function $F_m(z)$, and $$\kappa_m = (k^2 n_1^2 - \beta_m^2)^{\frac{1}{2}} \qquad (13)$$

is the transverse component of the propagation vector in a thin film waveguide theory with zig-zag disposed plane waves, and $(-2\phi_m)$ is the reflection phase of these waves at the boundary surface $n_1/n_0$.

Further $k = 2\pi/\lambda$ is the propagation constant of light in a vacuum. By introducing a polarisation index (for TE-polarisation $\sigma = 0$ and for TM-polarisation $\sigma = 1$) the reflection phase $\phi_m$ can be expressed as $$\phi_m = \arctan[(n_1/n_0)^{2\sigma}(\beta_m^2 - k^2 n_0^2)^{\frac{1}{2}}/\kappa_m] \qquad (14)$$

In a not too thin film type waveguide with many modes, the phases $\phi_m$ of most of these modes are very nearly $\phi_m = \pi/2$. Accordingly the righthand side of equation (14) can be expanded into a series of powers of $K_m$ $$\phi_m = \pi/2 - D_{10}\kappa_m + \text{higher terms} \qquad (15)$$

Thus for all modes having mode numbers which are not too high the following will apply (with $\beta_m = kn_1$)

$$D_{10} = k^{-1}(n_0/n_1)^{2\sigma}(n_1^2 - n_0^2)^{-1/2}. \qquad (16)$$

After substitution of equation (15) in the dispersion equation (12), then if the higher terms of equation (15) are neglected there is obtained $$\kappa_m = (m+1)\pi/W_{eq,z} \qquad (17)$$

provided that the equivalent thickness is introduced as $$W_{eq,z} = W_z + 2D_{10}.$$

Finally, after several conversions introducing $(\beta_0 + \beta_m) \approx 2kn_1$, there is derived from equations (17) and (13) the phase position $\psi_m$ of the $m$th mode related to the fundamental mode $(m = 0)$ $$\psi_m = (\beta_m - \beta_0)L = -\pi(m^2 + 2m)[L\lambda/4 n_1 W_{eq,z}^2]. \qquad (19)$$

From this expression there follows directly the validity of conditions of equations (8) and (9) in thin film waveguides, provided in all cases that the square bracket in equation (19) is equal to an integer number $h_r$. This latter condition is however inherent in the imaging condition of equation (1), which is thereby provided. The ideal phase positions of the modes are consequently $$\psi_m = -(m^2 + 2m)h_z\pi. \qquad (20)$$

In order to determine the quality of the image provided by a thin film waveguide, it is assumed that there is an infinitely thin object at $z = z_0$ in the object plane $x = 0$, and the resulting light distribution of the image at $x = L$ is calculated. For this purpose we put $V_0(z) = \delta(z - z_0)$, wherein $\delta$ indicates the so-called Delta function.

According to equation (6) the amplitudes are $a_m = F_m(z_0)$ and according to equation (7) the image is produced $$V(z,L) = \sum_{m=0}^{M} F_m(z) F_m(z_0). \qquad (21)$$

The validity of equation (8) has here been assumed and the phase factor $\exp(i\beta_0 L)$ has been omitted. For the purposes of evaluation the mode functions of the thin film waveguide were employed in a form corresponding to the approximations made in the preceding passage. For the purposes of simplification there has also been neglected here the difference between the geometrical thickness $W_z$ and the equivalent thickness $W_{eq,z}$. (The index "$z$" or "$eq,z$" appended to W is therefore frequently omitted in the following description). Nevertheless for thin film waveguides with many modes the results obtained remain qualitatively correct. With $\kappa_m$ expressed as in equation (17) the mode functions are explicitly given $$F_m(z) = 2^{\frac{1}{2}} \sin \kappa_m z \qquad (22)$$

and the evaluation of the sum in equation (21) produces the amplitude distribution $$S(z,z_0) = \frac{1}{2} \frac{\sin[(2M+1)\frac{\pi(z-z_0)}{2W}]}{\sin[\frac{\pi(z-z_0)}{2W}]} - \frac{1}{2} \frac{\sin[(2M+1)\frac{\pi(z+z_0)}{2W}]}{\sin[\frac{\pi(z+z_0)}{2W}]} \qquad (23)$$

Except when $z$ or $z_0$ lie in the immediate vicinity of the boundary surfaces indicated by $z = 0$ or $z = W$, it is possible to neglect the second term at the righthand side of the equation. The first term then indicates that the light distribution in the image depends only upon the distance $(z-z_0)$ from the centre of the image $z_0$, but not, however, upon the absolute position $z_0$ of the image. This effect was also observed experimentally. The full half width $r$ of the intensity distribution $|S(z,z_0)|^2$ is therefore $$r = W/M. \qquad (24)$$

This width also has at the same time the significance of a spatial resolution capability for the thin film waveguide as an imaging system: two object points will then only give separately discernable images when their spacing has at least the value $r$. The meaning of equation (24) is therefore also that the maximum number of resolvable points is equal to the number M of the modes of the waveguide utilised for the imaging process.

From the expression $r = W/M$ it follows that the resolution is the better the greater is the number of modes M which make constructive contribution to the imaging. This number M of the contributing modes is limited by various factors:

(a) the number M cannot be greater than the number $M_0$ of the modes capable of being propagated in the thin film waveguide. In order to keep $M_0$ large, the difference between the refractive indexes $(n_1-n_0)$ and $(n_1-n_2)$ may not be too small, and the condition $W >> \lambda$ should apply.

Figure 3:
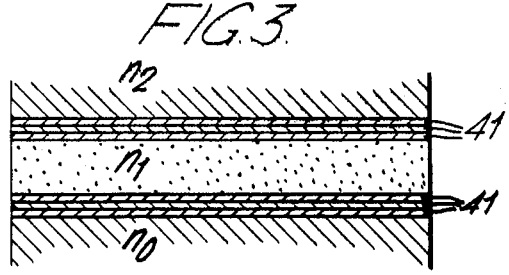
FIG. 3 is a phase-corrected waveguide.

(b) The derivation of the imaging conditions was done by neglecting several things, for example by omitting the higher terms in equation (15). The effect of these omissions is very slight in the case of the modes with lower numbers ($m << M_0$), but the effect can rapidly increase with higher values of $m$. For the highest of the modes possible according to paragraph (a) the actual phase positions $\psi_m$ deviate in general quite substantially from the ideal value given in equation (20). These highest modes do not therefore make a contribution to improving the image quality, but cause an undesirable reduction in the brightness contrast and can even produce false structures in the image. For this reason it is advantageous if M is markedly smaller than $M_0$, for example $M < M_0/2$. This again demonstrates the advantage of a high total number $M_0$ of possible modes. This necessary limitation of M can in practice be achieved, for example, by limiting the aperture of the irradiating optical system or, better still, the observation optical system of the image. Apart from what is said above it is however also possible to diminish the influence of the above mentioned omissions by structural measures. In fact these factors which have been neglected have in part counteracting influences upon the phases $104_m$. Accordingly it is possible in principle, by variation of the refractive indexes $n_0$ and $n_2$, the thickness $W_z$ and possibly the polarisation, to make the phases $\psi_m$ almost equal to the ideal values of equation (20) for a number of modes as large as possible. In this optimisation it is naturally necessary for the dispersion equation (12) to be solved exactly (numerically) for all the modes. A more far reaching reduction of the phase deviations, and therefore an accompanying improvement of the image quality can be achieved by the introduction of one or more thin dielectric intermediate layers between the material $n_1$ of the thin film waveguide and the boundary media having the refractive indexes $n_0$ and $n_2$. In FIG. 3 there is shown a waveguide with phase correcting thin layers 41 of dielectric material.

(c) For a given imaging system the deviations of the phases $\psi_m$ from the ideal value are the smallest when using the smallest possible number $n_z$, i.e. for $h_z = 1$ or 2. In the images of higher order ($h_z = 3$) the phase errors of the modes are correspondingly greater and the image quality is poorer.

(d) Not least the number M of the modes contributing to the imaging is limited by the tolerances of the quantities L, $\lambda$, W, $n_0$, $n_1$, $n_2$ entering into the imaging equation (1). These tolerances have the effect that the expression corresponding to $h_z$ in equation (19) is practically not precisely integral. If the resulting deviation of a phase $\psi_m$ reaches the value $\pi/2$ the particular mode ceases to make a constructive contribution to the formation of the image. In such a case all the higher modes must naturally cease to make any contribution. Accordingly in the case of an image, to which M modes must still make a contribution, it is necessary that the relative deviations $$\Delta L/L, \Delta\lambda/\lambda, 2\Delta W/W$$

from the theoretical values satisfying equation (1) must all be small as compared with $\frac{1}{2}h_z(M^2 + 2M)$.

The refractive index $n_1$ enters twice into the imaging condition equation (1), namely in the one case directly, and in the second case indirectly through $W_{eq,z}$. Because the latter quantity constantly decreases with increasing values of $n_1$, there will always be, for given materials $n_0$ and $n_2$, a quite definite refractive index $\bar{n}_1$, in respect of which the imaging condition according to equation (1) will be unresponsive to small fluctuations of $n_1$. This exceptional value of the refractive index can be determined from the condition $\delta(n_1 W_{eq,z}^2)\delta n_1 = 0$. If one choses $n_1 = \bar{n}_1$, then an image once sharply adjusted will remain sharp even upon small variations of $n_1$. On the basis of the two above mentioned opposing influences of $n_1$ on equation (1) it is even possible in a corresponding way by suitable choice of the refractive index $n_1$ mutually to compensate small variations of L, W and $n_1$ caused by temperature influences. The condition for such a temperature conpensated image is $$\rho(n_1 W_{eq,z}^2/L) \delta T = 0.$$

(a) Finally it is to be observed that in asymmetrical thin film waveguides ($n_0 \neq n_2$) an imaging error can be caused by the fact that the symmetry relation in equation (10) only applies approximately. This error appears only in asymmetrical guides and only in the case of reversed images (odd values of $h_z$). Like the other errors already mentioned it increases with increasing mode number M and can limit the image quality. In symmetrical guides ($n_0 = n_2$) this error does not exist.

If the enclosing covering of the film type guide is not symmetrical ($n_0 \neq n_2$) then instead of equation (18) there will apply the expression $W_{eq,z} = W_2 + D_{10} + D_{12}$, in which case $D_{12}$ is defined as analogous to equation (16). For this case the equivalent film thickness has already been stated in detail in equations (2) and (3).

The principle already described in detail for the example of the dielectric thin film waveguide ($W_y >> W_z$) is however also valid for more general types of waveguides, for example those which do not rely upon total reflection, or those in which the transverse dimensions $W_z$ and $W_y$ are comparable, or even those in which $W_y >> W_z$.

From the start it is clear that the material having the refractive index $n_1$ of the dielectric waveguide may be solid liquid or gaseous, provided that it is sufficiently transparent at the wavelength which is used. The thin film guide ($n_1$) or one or both of the external materials ($n_0$, $n_2$) may also be formed of free space (air, vacuum). In every case, however, it is necessary for the boundary surfaces $n_1/n_0$ and $n_1/n_2$ to be reflecting to incident light which is almost in a glancing direction.

The highest reflection power corresponds in general to total reflection. This exists in the case where the refractive indexes $n_0$ and $n_2$ of the external media are smaller than the refractive index $n_1$ of the inner medium. As a particular example of a totally reflecting waveguide there may here be mentioned a guide for X-rays, in which case the inner space is (vacuum, ($n_1 = 1$) and is closed externally by any kind of material, whose refractive index ($n_0$ and $n_2$) is known to be somewhat smaller than one for X-rays, independently of the chemical composition. The practical construction of such a waveguide for $\lambda = 0.15$ nm could, for example, comprise two glass plates carrying deposits of evaporated aluminium, each 2.5 cm long and defining a gap of $1\mu m$. In this waveguide $n_1 = 1$ and $n_0 = n_2 = 1.8 \times 10^{-6}$ and $M_0 = 53$ modes can be propagated therein.

In the infrared spectral region, and particularly in the range of submillimeter waves and microwaves, a high reflection efficiency of the walls can also be achieved by the use of metals of high conductivity for the external materials.

In the case where the incident light is of high obliquity the so-called Fresnel reflection is almost total. Accordingly when using the waveguide here described an image is still obtained when one (or both) of the external media has a higher refractive index than the inner medium with the refraction index $n_1$. In this case, however, the reflection capability decreases quite rapidly with steeper incidence. In the resulting image the modes are then the more "leaky" the higher is the mode number. This effect can limit the number M of the contributing modes and can therefore limit the resolution. This case, in which $n_1 < n_0$ and $n_1 < n_2$ is of practical significance for waveguide lasers.

The essential mathematical condition for the validity of the imaging conditions according to equations (8) and (9) is that the differences between the propagation constants $(\beta_m - \beta_0)$ are in integer relationship to each other. According to equation (20) in the case of thin film waveguides these differences correspond to the numerical order $(m^2 + 2m)$. Thus, the possibility of obtaining optical imaging with a waveguide is determined by the spectrum $\beta m$ of its modes. Each prismatic waveguide of desired cross section and desired distribution of the refractive index over the cross section can produce an optical image for which all the differences $(\beta_m - \beta_0)$ in its mode spectrum are integral multiples of a smallest difference $\Delta \beta$. The length $2\pi/\Delta\beta$ is then one of the possible imaging lengths. If this condition is not quite precisely satisfied, or is not satisfied for all modes, then only an image of reduced quality is possible.

A rectangular ribbon shaped waveguide which is thick relatively to the wavelength ($W_z >> \lambda$; $W_y >> \lambda$), such as is shown in FIG. 2, is a waveguide wherein the above mentioned condition is satisfied for rational relationships of the mode intervals. The waveguide then provides two-dimensional imaging. In the rectangular waveguide the modes depend upon two mode numbers $m_y$ and $m_z$. The field distributions are approximately of the form $$F_{m_y, m_z}(y,z) = 2\sin(\kappa_{m_y} y) \sin(\kappa_{m_z} z) \quad (25)$$

wherein $$k_{m_y} = (m_y + 1) \pi / W_{eq,y} \quad (26)$$

$$k_{m_z} = (m_z + 1) \pi / W_{eq,1} \quad (27)$$

These approximations are valid when the mode numbers $m_y$ and $m_z$ are not too large. The spectrum of the propagation constants is $$\beta m_y m_z = (k^2 n_1^2 - \kappa_{m_y}^2 - \kappa_{m_z}^2)^{\frac{1}{2}}.$$

Likewise for small values of $m_y$ and $m_z$ one derives herefrom the phase positions of the modes as $$\psi_{m_y, m_z} = (\beta m_y m_z - \beta_{o,o}) L = \quad (28)$$

$$-\pi \left[ \frac{m_y^2 + 2m_y}{\frac{4n_1 W_{eq,y}^2}{\lambda L}} + \frac{m_z^2 + 2m_z}{\frac{4n_1 W_{eq,z}^2}{\lambda L}} \right]$$

The condition for rational relationships of these mode intervals is satisfied when equation (1) and equation (4) are valid simultaneously, i.e. when the transverse dimensions $W_{eq,y}$ and $W_{eq,z}$ of the waveguide are related to each other as the square roots of small integers. The simplest structural form is therefore the waveguide of square cross section. However, the foregoing calculation shows that numerous other cross sections with the side ratios $W_y/W_z \neq 1$ are suitable for imaging.

In waveguides having other polygonal cross sectional shapes, the mode intervals, so far as is known, are not in approximately rational relationships so that in those cases no images are possible in the sense here being considered. Nevertheless the dependence of the mode spectrum upon the cross sectional shape of the waveguide opens up the possibility of applying correction to the mode spectrum of a rectangular or square cross section waveguide and thus to improve its imaging characteristics. For example, the correction consists in a very slight change in the rectangular or square cross section so that this is slightly distorted into barrel shape or cushion shape. The resulting displacements in the spectrum of $\beta m_y$, $m_z$ have different magnitudes for the modes with the lower mode numbers as compared with those having the high mode numbers. This nonuniform behaviour can then be utilised for suppressing undesirably large deviations of the phases $\psi_m$ from their ideal values according to equation (20) so as to reduce this to the smallest possible residual error for as many modes as possible, so that the number M of the modes making constructive contribution to the imaging process is increased. The precise shape and the correct dimension of the optimum distortion of the cross section depend upon the values of the refractive indexes and can be determined in individual cases by numerical calculation of the mode spectra in systematically distorted shapes of cross section.

A further possibility for correcting the phases $\psi_m$ is the application, already referred to in the thin film waveguide shown in FIG. 3, of thin dielectric layers upon the wall of the actual waveguide medium having the refractive index $n_1$. This possibility also exists with waveguides having rectangular or other cross section.

For many applications imaging systems are necessary, which with a given resolution r, have a field of view which is greater than the magnitude $W = M/r$, which may be achieved in practice with a simple film type waveguide or a rectangular waveguide. In these cases it is possible to stack the waveguides or to make them into a bundle in order to achieve a larger field of view. Such a stack of film type waveguides 51 is shown in perspective in FIG. 4a and is shown in cross section in FIG. 4b. Film type waveguides of equal thickness having the refractive index $n_1$ are separated by thin intermediate layers 52 of a material of lower refractive index $n_0$.

The intermediate layers must have such a thickness that adjacent film type waveguides are optically "insulated" from each other. If the difference between the refractive indexes is sufficiently high, for example $(n_1 - n_0) \geq 0.1$, it will suffice to have a thickness of the intermediate layers of about one wavelength. If the thickness $W_z$ of the film type waveguides and their length L are dimensioned according to equations (1) and (4), then each film type waveguide will image its individual end face in sequence. In order to ensure that the ribbon shaped images of the individual film type waveguides constitute a continuous overall image in the exit plane of the stack, it is necessary that all of the individual films must be dimensioned for operation with even values of $h_z$. With a simple stack according to FIG. 4 (a) it is therefore possible to produce a unidimensional erect image of a large field of view. Its dimension is equal to the height of the stack and can therefore in principle be chosen to be as large as desired.

A particular construction of an individual film type waveguide, or a stack, will result if its width $W_y$ (see FIG. 4a) is equal to the length L (or a multiple thereof). A waveguide or stack so dimensioned has the remarkable property that it will image its four side faces standing normal to the plane of the film on the respective oppositely situated side faces.

FIG. 4c shows the bundling of square or rectangular section ribbon shaped waveguides 53. In this way it is possible to achieve a two-dimensional imaging with a large field of view. The individual ribbon type guides 53 must again be dimensioned with even numbers of $h_y$ and $h_z$ according to equation (1) and equation (4), and to ensure their optical "isolation" the condition applies which has already been mentioned for the stacked film type waveguides 51. The optical behaviour of such a bundle is comparable with a so-called fiber-optical plate. Nevertheless in comparison with the last mentioned device it is possible by the use of a bundle of the type here described according to FIG. 4(c) to achieve a higher spatial resolution $r$, and to do this with a substantially smaller number of individual fibers and at the same time with increased packing density. In the case of a fiber-optical plate the resolution is limited by the fiber diameter to about 6μm whilst in the case of a ribbon type guide it is possible to achieve a resolution $r = 1 \mu m$. Nevertheless in the present case there exists the necessity for smaller tolerances of the individual guides and monochromatic illumination.

The terminology previously used herein, namely "one-dimensional" and "two-dimensional" imaging in the case of thin film waveguides and ribbon wave guides refers to the imaging sequence of the waveguide end faces, and it recognizes the fact that the walls of the waveguide restrict the free propagation of light in one or in two dimensions. However, a waveguide does not image only the plane pair $x=0$ and $x=L$ onto each other, but, on the contrary, all the pairs of planes, whose spacing L satisfies the equation (1), for example the pairs of planes AA', BB', CC' and so on in FIG. 5(a). This means that the volume of the waveguide is imaged. In this sense therefore a waveguide makes possible an imaging in the third dimension (x direction).

The foregoing consideration shows that the previously considered imaging of the end faces in sequence remains possible if these faces are not normal to the direction of the waveguide but in each case enclose the same angle $\alpha \neq 90°$ with the waveguide. Waveguides of this kind are explained with reference to FIG. 5. From the diagram in FIG. 5(a) it follows that in the case of a inverted image (odd numbers of $h_z$) the end faces must be inclined in opposite directions as in FIG. 5(b), whilst in the case of an erect image the end faces must be parallel as in FIG. 5(c). The dimension of the angle $\alpha$ can be as desired. Nevertheless this angle should not be too small, because otherwise the number of the modes contributing to the imaging will be limited. If in the case of a thin film waveguide the Mth mode is required to make a contribution to the imaging, then the angle $\alpha$ must be greater than the angle $\alpha_M$ between the x-direction and the direction of the two plane waves, which may be considered to compose the mode $$\alpha_M = \arcsin(\kappa_M/kn_1) = (M+1)\lambda/2n_1 W_{eq,z} \quad (29)$$

On the basis of the imaging of the third dimension shown in FIG. 5(a) it is also possible to have a still further modification of the waveguide end faces without any loss of the imaging characteristics. The end faces can take a quite optional regular or irregular curved form, as for example in FIG. 5(d). If now the shapes of the entry and exit faces are the same (or in the case of an odd number $h_z$ similar but reversed) and the waveguide has the above described dimensions then the entry face is imaged upon the exit face and vice versa. These possibilities of imaging inclined or curved end faces upon each other naturally also apply in the case of rectangular or prismatic guides of ribbon form in the same way as they apply to thin film waveguides.

An imaging waveguide of thin film or ribbon form, wherein object A and a real image A' are both situated outside the waveguide is shown in FIG. 6 in cross section. For simplifying the explanation it is here assumed that the optical media before and following the waveguide 83, that is to say in the spaces $x<0$ and $x>L_V$, have the same refractive index $n_1$ as the waveguide. Let the object A be small (height $H<<W_z$) and situated in the neighbourhood of the centre plane of the waveguide at $x = -d$ only a small distance in front of the entrance of the waveguide. It will first of all be assumed that the length of the waveguide is equal to the value L, which satisfies equation (1) (with dashed indication in FIG. 6). The waveguide then produces an image A' of the object at the position $x = L - d$. If M indicates the mode number of the highest mode induced in the waveguide, then the image A' is only projected by such light rays which proceed at angles of at most $\alpha_M$ with respect to the x axis, $\alpha_M$ being as indicated in equation (29). For this reason the region indicated by the double hatched portion in FIG. 6 remains dark. Accordingly it can have no influence upon the quality of the image A', if one removes the reflecting walls of the waveguide in the indicated region $L_\nu \ldots L$, that is to say if the waveguide is shortened to the length $L_\nu$. Accordingly the image A' comes to lie outside the waveguide as defined by the length $L_\nu$ of its walls. The previously virtual image has turned into a real one.

In the imaging process by means of a waveguide shortened in this manner the length L indicates that which is included in the fundamental equation (1), but no longer the length of the waveguide but, on the contrary, the spacing of the image from the object. Similarly as in a 1:1 imaging conventional optical system this spacing distance L is independent of the offset distance $d$ of the object. The possible shortening $(d+d')$ of the waveguide is naturally limited. With increasing amount of shortening the quality of the image A' diminishes because the above mentioned argument based on beam optics is only valid in the vicinity of the image A'. The maximum possible shortening is determined by the thickness $W_z$ of the guide and by the angle $\alpha_M$, and it also depends upon the magnitude of the object to be imaged. This is illustrated in FIG. 7. In accordance with considerations discussed in connection with FIG. 6 an image can only be sharp if the image point A' lies in the double hatched angle region at the end of the waveguide 93 in FIG. 7. Because the imaging process must be reversable, it must also be demanded that the object point A lies in the marked angle region at the entry of the waveguide. From FIG. 7 it follows that the more the waveguide is shortened, the more will the points $P_1$ and $P_2$ converge, at which points the image field has the dimension O, and the smaller will become the sharply imaged field of view. The maximum possible shortening according to FIG. 7 amounts at each end to $$d_{max} = d'_{max} = W_z/2\alpha_M = n_1 W_z^2/(M+1)\lambda = L/4h_z(M+1) \quad (30)$$

As an example of the thin film waveguide above considered ($n_1 = 1.5$; $W = 50\mu m$; $\lambda = 632 nm$, $M = 20$) the equation (30) delivers the value $d_{max} = d'_{max} = 0.3 mm$. Of the maximum shortening values according to equation (30) practically only a portion is capable of use, because firstly for the case $d \rightarrow d_{max}$ or $d' \rightarrow d'_{max}$ the magnitude of the image field shrinks to zero, and, secondly, upon the object point or the image point approaching the limits of the marked region in FIG. 7 quite marked image errors occur. This follows from a more detailed observation of the distribution of light at the boundaries of the dark spaces indicated in FIG. 6. The diaphragm 91 shown in FIG. 7 will be further explained in the following.

In order actually to attain the theoretically possible resolution when using an imaging waveguide of the type here described it is in general necessary to provide for apodization. In equation (23) there was expressed the amplitude distribution $S(z,z_0)$ which exists in the image projected by a waveguide from an ideal point shaped (or linear) object. The resulting intensity distribution possesses, in addition to the central maximum, a series of relatively strong subsidiary maxima. These arise from the fact that $S(z,z_0)$ is the Fourier transformation of the light distribution in the mode spectrum, and that this distribution is abruptly cut off at the mode number M. If however such higher modes which do not satisfy the imaging conditions of equations (8) and (9) should be induced to any noticeable extent, then numerous further maxima and fine structures could appear in the point imaging function $S(z,z_0)$, which are highly undesirable in an "image" of a point. These disturbances and the subsidiary maxima referred to can be reduced or removed if it is possible to prevent the higher modes $m > M$ from contributing to the image formation. For the achievement of this so-called apodization two possibilities exist in the imaging process with a waveguide (of the thin film or ribbon type): either the propagation of the higher modes in the waveguide is damped so that these modes arrive in a very much weakened condition at the location of the image, or a spatial filtering of the image is effected.

In a thick waveguide of the film type having loss-free core material ($n_1$) damping of the mode propagation can be achieved either by absorption of the guided light in the surrounding materials or by refracting the light into these materials ($n_0 > n_1$; $n_2 > n_1$). For both types of damping mechanisms the absorption constant increases proportionally to $(m+1)^2$ with the mode number $m$. Both of these mechanisms are therefore well suited for apodization. In practice it is only a question of so adjusting the extent of the losses that they only become effective from the desired mode number M. M is thus, for example, the highest mode up to which the imaging conditions of equations (8) and (9) are valid. If $K_M$ is the effective absorption constant of this mode of the waveguide, then the apodization requires that $kLK_M = 1$. If the damping depends only upon absorption in the substrate material ($n_0$) then with TE-polarisation the necessary absorption constant $\bar{\kappa}_0$ (imaginary part of $n_0$) of their material is given by $$\bar{\kappa}_0 = (n_1^2 - n_0^2)^{3/2}(M+1)^{-2} W_z/2h_z n_0 \lambda \quad (32)$$

A very similar effect may however also be achieved if, as shown in FIG. 8, very thin metal films 101 are provided at the boundary surfaces $n_1/n_0$ and $n_1/n_2$. These layers may, for example, be of aluminium, gold, nickel or chromium, and their thickness must be in the region 10–100 nm. The metal layers may also combine with dielectric layers, which may be applied for correcting the mode spectrum at these boundary surfaces. Metal layers are also capable of being employed as reflection increasing layers, especially in the so-called leaky waveguide which are characterised by $n_0 > n_1$ or $n_2 > n_1$. Without taking special measures to increase reflection the damping in these leaky waveguides is in fact so great that an undesirably high degree of apodization exists, which results in a reduced resolution $r$. By the use of a partially reflecting metal layer (101), which is absorbent to a limited degree, and of which a suitable thickness is (10–100 nm) the leak damping is reduced and the apodization can be adjusted to the desired value.

The disturbing modes $m > M$ are distinguished from the lower modes by the fact that the directions of the rays possess greater angles $\alpha_m > \alpha_M$. Accordingly the light of these higher modes can be filtered out by means of a simple diaphragm 91 at a sufficiently large distance behind the image as indicated in FIG. 7. The size of the diaphragm 91 must be so chosen that it admits the angular range $2\alpha_M$. Still more advantageous than the abruptly interrupting diaphragm is a mask, whose transparency progressively reduces from the centre to the margins thereof in accordance with a desired apodization function. If one observes the image produced by the waveguide through the diaphragm or through the mask, then the mentioned disturbing near maxima remain invisible because the high spatial frequencies corresponding thereto are lacking.

An important property of all the imaging systems here described is that by means of suitable modification they may also be arranged to deliver a magnified or reduced image. As an example of this there is shown in FIG. 9 a waveguide 113, whose cross section gradually increases or contracts in the direction of propagation. The linear magnification or reduction ratio $\mu$ $W_{eq}(L)$-$W_{eq}(O)$ is in this case equal to the ratio of the equivalent waveguide thicknesses at the end and beginning of the waveguide. The possibility of achieving such a scale changing imaging operation is based on the known microwave technique principle that in the case of a waveguide having a variable cross section in the x-direction, if a mode is once excited this will adapt itself to all cross sectional changes provided that these changes take place slowly, i.e. over distances of a great many wavelengths. Accordingly, if at the beginning of the waveguide according to FIG. 9 modes with certain amplitudes $a_m$ are developed, then there will always be the same distribution of the amplitudes $a_m$ at the end of the waveguide, but the mode functions $F_m(z)$ have been changed. According to equations (22) and (17), in thin film waveguides the variation corresponds simply to a scale transformation in the ratio of the equivalent film thicknesses at the beginning and end of the waveguide. A magnified (or demagnified) image appears in the exit surface only if all of the modes unite again at that point in the same phase. The conditions according to equations (8) and (9) are again that $\exp(i\psi_m) = 1$ and ex- $p(i\psi_m) = (-1)^m$, wherein the relative phase positions $\psi_m$ are given by $$\chi_m = \int_0^L [\beta_m(x) - \beta_o(x)] dx \quad (33)$$

on the assumption that in each mode the light conforms adiabatically to the local cross sectional shape and proceeds with the propagation constant $\beta_m(x)$ corresponding to the local cross section, the phase positions $\psi_m$ can be calculated. To the same approximation as in equation (19) it is found that $$\psi_m = -(m^2 + 2m) \pi [L/4n_1 W^{-2}_{eq,z}] \quad (34)$$

with a determined equivalent film thickness $$\overline{W}_{eq,z} = \left[ L^{-1} \int_0^L W_{eq,z}^{-2}(x) dx \right]^{-\frac{1}{2}} \quad (35)$$

By comparison of equation (34) with equation (19) it is seen that all the results which were obtained for the film type waveguide of uniform thickness are also valid for the film type waveguide whose cross section varies in a slow progressive manner, if the equivalent thickness $W_{eq,z}$ is replaced by the thickness determined according to equation (35). In particular the fundamental imaging according to equations (1) and (4) still remain valid as do the considerations concerning inverted and erect images, as also the further discussed considerations concerning multiple images. Furthermore there will still apply all the stated possibilities of one-dimensional and two-dimensional imaging with film type waveguides and ribbon type waveguides. The number M of the modes contributing constructively to the formation of the image is however determined by the narrowest cross section. In the waveguides here under consideration this cross section is smaller than the same mean thickness $\overline{W}_{eq,z}$ in a uniform waveguide. This fact is of importance for the practically achievable conditions of magnification or demagnification, because the narrowest cross section must always permit the existence of a number of modes which is not too small $M >> 1$ so that a significant image can be formed.

A further consequence of equation (35) is that slight local differences in the thickness, caused for example by irregularities in the boundary surfaces $n_1/n_0$ do not lead to a loss in the image characteristics only so long as the mean thickness $\overline{W}_{eq,z}$ satisfies equation (1). The above calculated tolerance $\Delta W/W$ relates only to the mean film thickness and not to local deviations, which can be greater.

The wedge shaped film type waveguide 123 shown in FIG. 10 is the simplest form of a waveguide with locally variable cross section because it possesses plane walls or boundary surfaces 124, 125. For this waveguide equation (35) provides that the mean thickness $\overline{W}_{eq,z}$ is equal to the geometric average of the equivalent film thicknesses at the beginning and end of the waveguide $$\overline{W}_{eq,z} = [W_{eq,z}(O) \, W_{eq,z}(L)]^{1/2}. \quad (36)$$

As an example there will be considered a film type waveguide similar to that in FIG. 1. When its film thickness increases from 25 $\mu$m to 100 $m$ in a wedge fashion the determined equivalent film thickness again amounts to $\overline{W}_{eq,z} = 50$ $\mu$m. In the case of a waveguide length of $L \approx 24$mm and red He-Ne laser light one obtains an inverted image which is magnified in the ratio of the end faces of the guide, that is to say 100:25. At the thin end it is possible for about $M_0 = 25$ modes to exist. If $M = 15$ of these make constructive contribution to the image, then the spatial resolution at the thin end will be $r = W/M \approx 1.7\mu$m and at the thick end $r \approx 7\mu$m The possibility of obtaining a magnified image with a waveguide limited by plane surfaces is therefore particularly interesting, because the magnification ratio may be varied in the simplest manner in a waveguide of film type according to FIG. 10 of liquid or gaseous material having the refractive index $n_1$. For this purpose it is only necessary to move one of the boundary surfaces 123, 124 of the waveguide relative to the other this being done in such a manner that the film thicknesses at the end faces vary in the desired manner, whilst at the same time, however, the geometrically determined mean film thickness must be retained.

All the previously explained examples were treated on the basis that the medium is a homogeneous light conducting film arranged between two materials with the refractive index $n_0$ (FIG. 1). The dimension of the film type waveguide in the $y$ direction was assumed previously to be very great as compared with the wavelength.

FIG. 11 shows in perspective form a different possibility of applying to integrated optics the principle of imaging an object A as an image A' by means of a waveguide 133 fed by a light source 131. The substrate 132 has the refractive index $n_s$. The waveguide here represented having the refractive index $n_1 > n_s$ has in the y-direction a thickness $W_y$ which is only of the order of magnitude of a wavelength of light, so that in the y-direction it is only possible for a few modes to exist. In this case for the purposes of simplification it is assumed that there is only a single mode. By correct choice of its dimensions $(L, W_z)$ the waveguide 133 will deliver a one-dimensional image of one end face at $x = 0$ upon the oppositely situated end face at $x = L$. The imaging equation (1) will again apply. However, instead of using the refractive index $n_1$ in this case there must be inserted the so-called "effective index" $N_0$ of the particular film waveguide mode which is employed.

The practical embodiment of such an imaging waveguide for integrated optics could consist of a quartz substrate of a refractive index $n_s = 1.458$, to which is applied by cathode sputtering a film of $(BaO + SiO_2)$ having the refractive index $n_1 = 1.60$. With a film thickness $W_y = 0.5\mu$m, the effective index of the TE$_0$ mode for He-Ne laser light will be about $N_0 = 1.55$. This waveguide will produce an image with $h_z = 1$ if its dimensions for example amount to about $L = 4$mm and $W_z = 20\mu$m. In the z-direction of this waveguide it is possible for $M_0 = 17$ modes to exist. If of these modes $m = 10$ contribute constructively to the image one obtains in the z-direction of FIG. 13 a spatial resolution of perhaps $r = 2\mu$m.

It is obvious that, when using waveguides according to FIG. 11 having also a gradual increase of the demagnified $W_z$ corresponding to FIG. 9, magnified and diminished images are also possible. Furthermore, by means of the above described stacking arrangement, in which numerous similar guide paths are provided in adjacent relationship in the z-direction on the same substrate, it is possible to obtain a larger imaging field of view.

In the self-imaging system shown in FIG. 11 a ribbon type waveguide is used in the form of a homogeneous discrete layer applied to a substrate by vapour deposition or cathode sputtering. The advantages of the self-imaging system are, however, not restricted to waveguides having a homogeneous refractive index as already explained above. Accordingly there will be explained in the following several possibilities of obtaining self-imaging systems for integrated optics with more general refractive index contours.

Figure 12A:
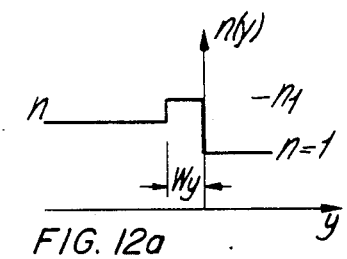

FIG. 12(a) shows the refractive index profile of a ribbon type guide according to FIG. 11, i.e. a waveguide having, over its thickness $W_y$, a constant refractive index $n_1$ which is greater than that of the underlying substrate and naturally also greater than that of the superposed medium (air).

Figure 12B:
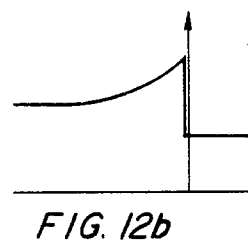
Figure 12C:
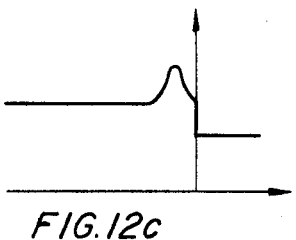
Figure 12D:
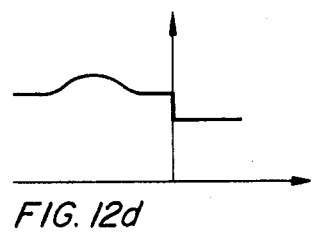
Figure 12E:
Figure 12F:
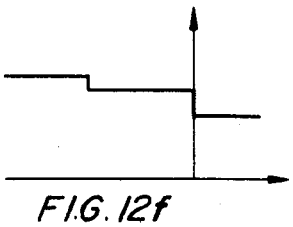

In contrast to this it is possible, for example, by ion implantation into the surface of a substrate or by outward diffusion, to produce a film type waveguide whose refractive index $n = n(y)$ decreases from an absolute maximum at the substrate surface ($y=0$) with increasing depth ($-y$) according to the curve shown in FIG. 12(b). An absolute maximum of the refractive index can also be achieved, which preferably exists a few wavelengths, or deeper, underneath the surface, as shown in FIG. 12(c), 12(d). For the purpose of forming a relative maximum, it may also suffice to reduce or increase the refractive index below a certain depth of the substrate as is shown in FIG. 12(e) and 12(f). In each case it is however necessary, in order to achieve a definition of the waveguide width $W_y$, to provide that the index contour $n(y)$ in the region $W_z$ differs markedly from that externally of the width $W_z$ of the ribbon, as already explained.

A simple practical example of an optical component with a self-imaging ribbon type waveguide, which can be produced from one of the film type waveguides with a general index contour is the waveguide crossing shown in FIG. 13. It consists essentially of a portion of a film type waveguide 3 (in the simplest case rectangular) having one of the index profiles of FIG. 12 and having such dimensions L and $W_z$ as to satisfy the originally defined imaging condition with an integral odd value of $h$ and an effective index $N_\mu$ of the film waveguide. At the oppositely situated short end faces of the rectangle there are provided two narrower strip type guides 1, 2 and 1', 2' for supplying and extracting the optical information. Appropriately these narrower strip guides are prepared in one operation together with the rectangular self imaging ribbon type waveguide 3. The adjacent narrow strip guides should not be coupled to each other. Unlike the so-called "bifurcation" of a waveguide, these narrower strips should be clearly separated from each other until they reach the rectangular ribbon type waveguide.

The mode of working of this arrangement is that the light is incident through guides 1 and 2 from the left-hand side (in FIG. 13).

The ends of these strip guides together form the object, which is imaged by the rectangular ribbon wave-guide upon the righthand end face (FIG. 13). Because it was made a condition that $h_z$ should be odd, the positions of the images of the strip guides 1 and 2 are interchanged with respect to the object plane. The light fluxes are taken off by the strip guides 1', 2'. Apart from stray leakage and absorption losses this arrangement transmits all the incident light from 1 to 1' as well as from 2 to 2'. The arrangement is therefore equivalent to a so-called "zero-dB-coupler" of the microwave technique and the result represents a crossing over of the strip guides 1 and 2. It is clear that this principle of crossing over can be applied also to more than two guides, in which case there is always a reversal of the sequence of the guides. This guide crossing arrangement can also be combined with a magnification or demagnification by arranging that the imaging ribbon type waveguide is of trapezoid form instead of rectangular.

In many cases it is desirable to keep the structural length of the guide crossing as short as possible. In accordance with the imaging condition, this also demands that the width $W_z$ of the rectangular ribbon type guide should be as small as possible. There is, however, a lower limit to this. For the crossing over of two guides it is necessary for the width $W_z$ to be so large that in the z-direction it is possible for at least two modes of the ribbon type conductor to be in existence. In this limiting case of very narrow ribbon type guides the stated imaging condition applies however only approximately. In the case where only two modes exist with the effective indexes $N_0$ and $N_1$ of the ribbon type guide it is nevertheless possible to determine the length L from the relationship $$L = h_z(\lambda/2) |N_0 - N_1|^{-1}$$

In FIG. 14 there are shown three practical forms of a self imaging ribbon type guide, in which there is the possibility of reducing the image errors and therefore increasing the spatial resolution. For this purpose the effective refractive index of the film, from which the ribbon type conductor is made, is slightly changed at the margins. In the case of the ribbon type conductor according to FIG. 14(a) and 14(b) this variation is effected by the application of narrow ribbons of a material of different refractive index at the side edges of the ribbon analogous to FIG. 3. However, a further possibility exists, which, according to FIG. 14(b) or 14(c), consists in varying the thickness $W_y$ or the index contour $n(y)$ of the thin film guide at the side edges, not abruptly but only gradually, this being done over a path whose order of magnitude is one wavelength. This can be effected in a particularly simple manner if the ribbon type guide is made by diffusion through a mask. In such a case the unavoidable lateral diffusion will itself produce a gradual transition of the effective refractive index N from a relatively high value within the ribbon of width $W_z$ to a lower value at the outside.

The field of view, in the case of an individual ribbon type guide, corresponds with its width $W_z$, although in many cases, to satisfy the imaging condition, its magnitude would only suffice with very great length L of the ribbon type guide. As is shown in FIG. 15(a), and similar to that proposed in FIG. 4, for the purpose of increasing the field of view a number of similar ribbon type guides are arranged adjacent each other upon or in the same substrate. Each of the ribbons must provide an erect self imaging process, for which the condition is that the imaging perameter $h_z$ in the imaging condition is even. In such case the individual images assemble together in the same manner at the exit of the ribbon ($x=L$) similarly as in the case of the objects at the entry to the ribbon ($x=0$). The ribbons are appropriately produced from a wider film type waveguide, for example by etching narrow channels for achieving as far as possible complete isolation of adjacent ribbons.

It is clear that this principle of field of view enlargement is applicable also to magnifying ribbon type guides as is shown in FIG. 15(b). The width of the total arrangement continually increases in the x-direction. In this arrangement a possibility particularly worth mentioning is the flattening of the field of view, which may here be obtained by making the outer ribbon conductors $S_a$ in FIG. 15(b), which are longer than the inner ribbon conductors $S_i$, slightly wider also than said inner ribbon conductors $S_i$, so that in accordance with the imaging condition they possess a correspondingly greater imaging length.

In the practical form of the ribbon type waveguide according to FIG. 16 the provision of an absorbent material A at the sides of the ribbon guide produce an apodization. The absorbent material may, for example, be a thin metal coating which is deposited from vapour upon the side (FIG. 16(b) ). Alternatively it is also possible, according to FIG. 16(a) to employ a very narrow strip of the absorbent material Δ, whose width in the z-direction is of the order of magnitude of λ/4 and which is applied to the surface of the ribbon guide in the immediate vicinity of the side edges. A further preferred possibility of obtaining apodization of the imaging process in an integrated ribbon type waveguide consists in the diffusion of light absorbing ions (heavy metals) into the lateral edges of the ribbon form waveguide.

It is apparent that there are also many other practical examples of designing a self imaging waveguide in accordance with the invention (for example irregularly shaped end faces, with constantly increasing width for the purpose of image magnification, with narrow reflectors at one or both end faces for forming a laser, or with two ribbon shaped conductors connected to both end faces for forming a wave filter or wave coupler) such that self imaging waveguide with the index contour $n(y)$ are suitable as components in integrated optics.

As already mentioned it is possible for the cross section of the waveguide here described to be generally polygonal, apart from the rectangular shape, and to assume, for example, the shape of a regular triangle or hexagon. Also, right-angled triangles with certain side ratios come into consideration. In the case of the triangle with equal sides the transverse dimensions satisfying the imaging condition are that both are equal to the height of the triangle, that is to say $W_y = W_z = s(\frac{3}{4})^{1/2}$, wherein s is the side length of the triangle. In the case of regular hexagons the required transverse dimensions $W_y = W_z$ are equal to the spacing distance between two opposite sides. In the case where the cross section is that of a right-angled triangle, the quantities $W_y$ and $W_z$ are to be identified with the short sides of this triangle. The appertaining equivalent thicknesses $W_{eq,y}$ and $W_{eq,z}$ must satisfy the imaging conditions of equations (1) and (4).

Following the basic considerations a series of applied examples will now be given.

1. Laser-coupling

The described principle of the transmission and imaging by means of a thick waveguide of the film type greatly expanded in the y-direction can be employed in integrated optics in order to couple the radiation of a GaAs injection laser or amplifier 161 into a given light guiding film 162 (FIG. 17). A problem in this coupling process is that the active zone 164 of the laser cannot easily be brought into one plane with the light guiding film 162. When the laser is applied to the substrate 165 there remains a difference in height of, for example, $H = 10 \mu m$, which is determined by the covering layers and contact layers of the laser.

As shown in FIG. 17 this height difference can be overcome by forming an inverted image provided by a layer guide 163. The exit surface 168 of the laser, as an object, is imaged by this layer conductor 163 of thickness $W_z$ at the end 169 of the layer 162, whose thickness $W_F$ amounts, for example, to 1μm. In order to avoid the need for production of a sharply cut off end face of the guiding layer 162, there is applied to the latter a covering layer 166 of lower refractive index $n_D$ with a sharpened edge, which defines the conducting end of the layer 162. At the same time the refractive index $n_1$ of the material of the conducting layer 163 is selected to be equal to the refractive index $n_F$ of the layer 162, so that in the optical sense the conductive layer 163 consists partly of the layer 162 over the length indicated by L, that is to say this length is formed in common by both layers.

In order to achieve a high resolution image it is advantageous to make the conductive layer 163 symmetrical, i.e. to choose for its covering plate 167 a material of the same refractive index $n_2 = n_0$ as that of the substrate 165. The thickness $W_z$ and the length L of the conducting layer 163 must be designed with an odd value of $h_z$ in accordance with equation (1). To ensure that the image at the light exit surface is projected precisely at the height of the layer 162 the dimensions must be so selected that $W_z = W_F + H$. If, for example, $W_F 1\mu m$ and $H = 10 \mu m$, then for values of $\lambda = 8900$ Å, $n_1 = 1.51$ and $h_z = 1$, an imaging length of $L = 0.82$ mm must be employed. For precise adjustment of the imaging it may be advantageous to make the guiding layer 163 of a suitable liquid or plastic material. The image can then be adjusted to an optimum by up and down movement and tipping of the cover plate 167. Finally the cover plate 167 can be fixed in its position, for example by polymerisation of the material of the guiding layer 163.

Another solution of this coupling problem is possible if the height H of the active laser zone above the base surface is so great that it would produce impractically large imaging lengths L according to equation (1). In such a case it is possible to arrange the GaAs-laser 171 laterally adjacent the substrate 175 as is shown in cross section in FIG. 18. In this arrangement it is necessary for the height difference $H_1$ and the layer thickness $W_z$ to be adjusted until an optimum imaging effect is achieved. In this case it is of advantage that the edge $K_2$ of the substrate 175 does not need to be perfectly formed because the latter is situated in a dark position. However, the edge $K_1$ of the cover plate 177 should be as perfect and rectilinear as possible because this is situated almost in the light beam of the laser. If the edge $K_1$ is rough, then a portion of the laser light is scattered. The light guiding layer 172 and the covering layer 176 correspond to those in FIG. 17.

2. Coupling of guides

The arrangement shown in FIG. 17 and 18 can be employed in a somewhat modified form in order to couple two film type waveguides in the technique of integrated optics in such a manner that the light arriving at one of the guides is transmitted in the second guide. A known possibility for using coupling is a thin auxiliary film guide, which is applied to the ends of the guides to be coupled. In this case it is necessary for the three guides which take part to be gradually tapered towards their ends. A better solution of the coupling problem for monochromatic light is offered by the use of an imaging layer guide 183 according to FIG. 19 for joining two guides upon the same substrate or upon separate substrates. The simplest case which is here represented is the joining of two similar guides 182, 182' ($W_F = W'_F$) upon the same or upon two similar substrates 185, 185'. For the imaging film guide 183 a material is then chosen of the same refractive index $n_1 = n_F = n'_F$, so that the ends of the conductors 182, 182' again define the sharp edges of the covering layers 186 and 186'. The spacing distance L of the covering layers, and the layer thickness $W_z$ of the imaging film guide 183 are designed in accordance with equation (1) for an imaging process with the employed wavelength and with $h_z = 2$. The image is therefore erect. At the centre between the end faces E, E' of the conductors there is formed a inverted intermediate image of the conductor ends. Because this end image lies adjacent the side of the cover plate 187, it is dark at the oppositely situated side of the film guide 183 (refractive index $n_1$). It is therefore of no consequence whether at that point there is a common continuous substrate or whether the junction point of the edges K, K' of two separate substrates occurs in that position. Also any small irregularities of these edges do not disturb the imaging process, provided that their dimension in the x-direction does not substantially exceed the value $d_{max}$ defined in equation (30). The refractive index $n_2$ of the cover plate 187 need not, in the erect image here employed, be equal to the refractive index $n_0 = n'_0$ of the substrate material. In the case of ideal imaging, the coupler only couples respective similar modes of the conductors 182 and 182' to each other.

Various modifications of the coupling arrangement according to FIG. 19 are possible: If the layer thicknesses of the two conductors, or their refractive indexes, are different ($W_F = W'_F$ or $n_F = n'_F$), it is possible to effect a coupling of two similar modes by arranging that the imaging has a magnifying or diminishing effect, this being done by making the layer thickness $W_z$ of wedge shape. The magnification ratio must be equal to the ratio $\kappa_\mu : \kappa'_\mu$ of the transverse propagation constants of the mode $\mu$ to be coupled in the guides 182 and 182'. By the choice of a different imaging ratio ($\kappa_\mu : \kappa'_\mu$) it is possible also selectively to couple together different modes $\mu$ and $\gamma$ of the guides.

In the case where the waveguides to be coupled have different refractive indexes ($n_F = n'_F$) it is possible to omit the covering layers 186 and 186' if the refractive index $n_1$ of the imaging guide is chosen to be so small that this itself functions as a covering layer for the two waveguides 182, 182' ($n_1 < n_F$, $n_1 < n'_F$). In this case the length $L_2$ of FIG. 19 must satisfy the imaging condition of equation (1), and the end faces E and E' of the waveguides should be made as sharp and rectangular as possible.

3. Laser-resonators

Figure 20:
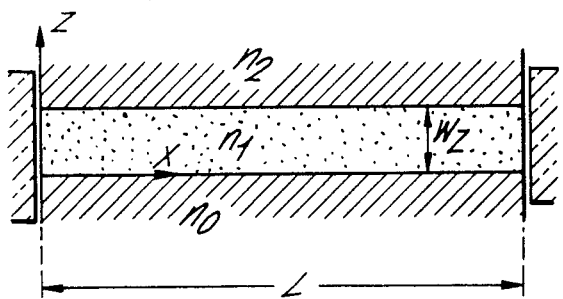

FIG. 20 shows a laser-resonator with an imaging waveguide 193. If, as shown in the drawing, an elongated section of waveguide is provided at both ends with plane mirrors, a resonator cavity is produced. The possible oscillation forms of this resonator can be primarily classified according to the number $q$, also defined as a longitudinal mode number, and being the number of node planes, $x$ = constant, of the electrical field. In addition to the number $q$ there is also a number of transverse modes, whose number in the case of film type waveguides corresponds to the so-called transverse mode number $m_z$ of the node planes, $z$ = const. In the case of rectangular cross section ribbon type waveguides, two transverse mode numbers $m_y$ and $m_z$ are necessary. The field images of the various transverse modes are identical with the fields of the corresponding waveguide modes of the same mode number $m_z$ (or respectively $m_y$ and $m_z$).

In a long hollow space resonator ($L \gg W_z$) the various transverse modes appertaining to the same number $q$ possess in general different resonance frequencies. For the construction of lasers this is undesirable. Accordingly open hollow space resonators are advantageous employed for lasers, in which the higher transverse modes ($m_z \leqq 1$) suffer increased deflection losses and therefore can be suppressed. If now a self imaging waveguide is provided, i.e. if its length satisfies equation (1) then all the transverse modes have the same resonance frequency. This can be recognised from the fact that the imaging condition of equation (1) is consistent with the conditions of equations (8) and (9). They signify that all the waveguide modes in a resonator of length L are simultaneously in resonance.

In a laser, whose resonator is designed according to equation (1), all the transverse modes $m = 0,1,2 \ldots$ of equal longitudinal mode number $q$ will oscillate, not only with equal frequency but also in the same phase, because it is wellknown that in a laser with frequency-depleted modes almost any kind of small non-linearity or other disturbance can suffice to couple the mode phases together. A resonator with a self imaging waveguide appears therefore to be particularly suitable for construction of lasers of high spectral purity ("single-frequency-laser"). The resonator corresponds in a certain respect with a Fabry-Perot-resonator with concentric spherical mirrors. However, in contrast to the latter, no increased diffraction losses take place in the resonator with the self imaging waveguide in the degenerate case, because all of the modes contributing to the imaging process are modes supported by the waveguide.

Figure 21:
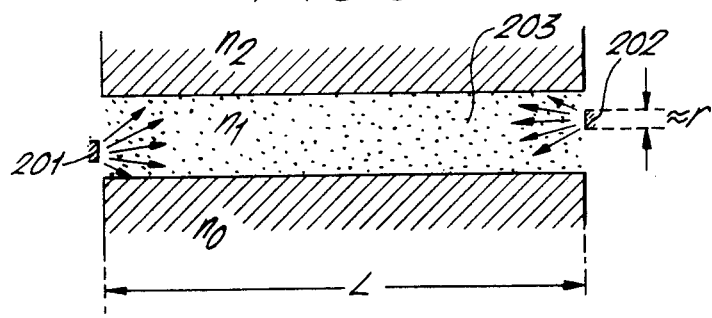

The above mentioned mode coupling can also be brought about intentionally and in a well defined form, this being effected by the use of sufficiently small mirrors 201, 202 at the ends of the resonator in accordance with FIG. 21. The size of these mirrors is appropriately somewhat greater than corresponds to the defined resolution $r$ of the waveguide 203 according to equation (24), and their position must be such that the waveguide images the mirrors upon eact other. One of the mirrors should be partially transparent in order to couple out the produced laser light. On account of the smallness of the mirror the light reflected thereby has a relatively large diffraction-limited aperture. In accordance with the derivation of equation (24) the reflected light propagates in the waveguide in the form of the M lowest modes. On account of the inherent self imaging property almost all the light arrives at the other mirror, whence it is again reflected back into the resonator. The convergence of the light precisely upon the small mirrors ($r \ll W$) results in almost complete mutual extinction of the M modes which are set up in the regions ($W-r$) of the end faces of the waveguide which are not occupied by the mirrors. This is, however, only possible if fixed phase characteristics exist between the M modes.

The most important property of the laser-resonator according to FIG. 21 is that it makes possible in a laser or amplifier the use in a simple manner of a large, almost uniformly irradiated volume of optically amplifiying material as to result in a single, spatially coherent, diffraction limited output beam. The property of almost uniform intensity distribution is the consequence of the simultaneous excitation of a large number (M) of modes. The only positions in which the modes completely extinguish each other are the above mentioned regions of the end faces near to the mirrors. In the total remaining volume of the waveguide the intensity distribution of the light is therefore more uniform than it whould be in the case of the establishment of only one individual mode. This prevents the effect of the so-called "spatial hole burning", which can easily cause instabilities, for example, in Nd:YAG lasers.

A possible modification of the arrangement according to FIG. 1 consists in using a small mirror only at one end of the waveguide whilst at the other end a large mirror covers the entire end face as in FIG. 16. In this case only that portion of the large mirror is effective which corresponds to the image of the smaller mirror. The distance L between the mirrors is in all cases to be chosen according to equation (1).

Figure 22:
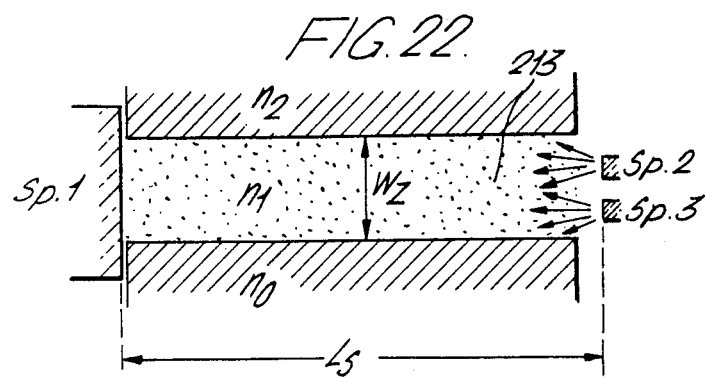

A further modification shown in FIG. 22 uses a self imaging waveguide 213, whose length $L_s$ is only one half of that which would be necessary for an imaging process according to equation (1), and which is closed at one end with a plane mirror Sp1 arranged normal to the axis of the waveguide. If the imaging equation (1) is satisfied with an odd value of $h_z$, this waveguide forms an inverted image of its open end upon itself. This follows from the characteristics of a waveguide that would be equivalent to FIG. 21, which consists of the section of length $L_s$ itself as well as of the mirror image of this section projected by the mirror Sp1. By setting up the two mirrors Sp2 and Sp3 at symmetrically disposed points at the open end, a resonator is formed from the waveguide. If the size of the mirrors Sp2 and Sp3 is sufficiently small then the resonator according to FIG. 22 has quite similar characteristics to that according to FIG. 21. In place of the two symmetrically disposed mirrors it is obviously also possible to employ a single mirror arranged in the axis.

Figure 23:
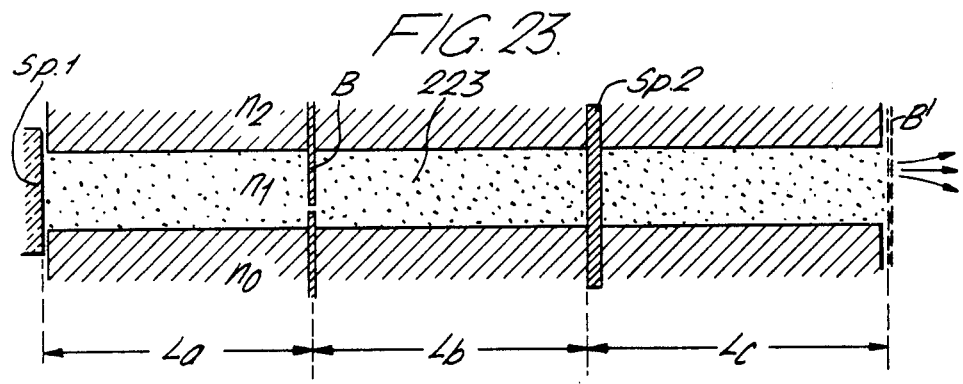

The small mirror of the above described examples can also be replaced by a slot or an aperture diaphragm B, which is inserted in a waveguide 223, which is closed off at both ends with large plane mirrors Sp1 and Sp2, as shown in FIG. 23. If the lengths $L_a$ and $L_b$ of the two sections of the waveguide to the right and left of the diaphragm B are so dimensioned that the diaphragm is self imaged at each individual side, there will again result a resonator with the advantages indicated with reference to FIG. 21. For the purpose of coupling out the laser beam, one of the end mirrors, for example mirror Sp2 may again be made semi-transparent. If the arrangement is completed by a further waveguide section of length $L_b$ the output beam appears focussed in the image B' of the diaphragm.

4. Amplifiers with large mode volume

Of great interest for amplifiers and lasers of the integrated objects type are the thin film waveguides or ribbon waveguides containing ions of the rare earths. Considered as the most important examples are neodymium-doped yttrium-aluminium garnet (Nd:YAG) and neodymiumpentaphossphate (NdPP). On account of the limited brightness of the available incoherent pump light sources it is advantageous to pump the amplifying waveguide from the side where it offers the largest surface. In order when doing this to ensure that a sufficiently large fraction of the incident pump light is absorbed in the waveguide the film thickness $W_z$ of the waveguide should be comparable with the absorption length of the amplifying material, i.e. about 2mm in the case of Nd:YAG and about 50$\mu$ m in the case of NdPP. On the other hand it would be advantageous for numerous applications of integrated optics if the waveguide were to support only a single mode, that is to say if it were very thin (ca.1 $\mu$m). A possible compromise between these conflicting demands could be to use a thick waveguide but only to drive a single mode out of the many modes capable of existing therein. However, this produces very difficult matching problems. In this case also the use of a self imaging waveguide offers advantages. The arrangement according to FIG. 24 corresponds in structure and mode of operation to a large extent to that according to FIG. 19. The light which is to be amplified arrives by way of a single mode in the waveguide 232 of the thin layer or ribbon type, which preferably consists of a material having the same refractive index as the optically amplifying material constituting the self imaging waveguide 233, i.e. $n_F = n_1$. As shown in the drawing the latter is so shaped that well defined end faces $K_1$, $K_2$ are formed for the guide 232, which end faces are self imaged in the waveguide 233. The imaging must be erect ($h_z$ being an even number). On account of the assumed equality of the refractive indexes $n_1 = n_F$ the optically effective thickness of the self imaging waveguide is $W_z = W + W_F$.

The mode of operation of this amplifier is that light incident in the guide 232 passes into the thicker waveguide 233 at the end face $K_1$. Therein it propagates as a mixture of many modes, but is at the same time uniformly amplified and is then fed back into the guide 232 at the end face $K_2$. The waveguide 233 can be substantially thicker than the guide 232 so that a better utilisation of the pump light is achieved. For example if the amplifying material consists of NdPP with a refractive index $n_1 = 1.60$, then for a wavelength $\lambda = 1.05$ $\mu$m and an amplifier length L=2mm the guide thickness can amount to $W_z = 12.5 \mu$m. This signifies a utilisation of the pump light which is increased by about one order of magnitude as compared with that which would be possible with a monomode thin layer guide ($W_F \geq 0.9$ $\mu$m). In the arrangement according to FIG. 24 it is necessary to avoid reflections at both end faces of the waveguide 233. These faces are therefore shown in the drawing as irregular. Instead of so doing they could be provided with a suitable absorber.

5. Filters

FIG. 25 shows a filter with a self imaging waveguide 243, which permits a spatial separation from each other of radiations of a wavelength $\lambda_1$ and double that wavelength $\lambda_2 = 2\lambda_1$. For this purpose the mixture of radiation ($\lambda_1$, $\lambda_2$) is fed through a diaphragm 244 in one half $E_0$ of the first end face of the waveguide, which produces an inverted self image for $\lambda_1$. The imaging condition (1) is therefore satisfied with an odd value of $h_z$. The radiation of wavelength $\lambda_1$ therefore emerges from the upper half of the other end face of the waveguide indicated by $E_1$. The imaging equation (1) is also satisfied for the radiation of the wavelength $\lambda_2$, but with an even number of $h_z^{(2)} = 2h_z^{(1)}$. The image for $\lambda_2$ is therefore erect and the radiation of wavelength $\lambda_2$ emerges from the lower half of the other end of the waveguide indicated by $E_2$. By means of the separating wall 245 it is possible to isolate the two forms of radiation. It is also possible in an analogous manner to separate other mixtures of radiation ($\lambda_1, \lambda_2$), if their wavelengths satisfy $\lambda_1 : \lambda_2$ and $h_z^{(1)} : h_z^{(2)}$, wherein $h_z^{(1)} + h_z^{(2)}$ must be odd.

Of particular importance in practice are self imaging systems for the purpose of beam spliting or beam coupling by the use of self imaging waveguides. Before explaining suitable practical examples there will first be described the basic principle of multiple imaging, with reference to an example of a film type of waveguide which is much more extended in the y-direction than it is in the x-direction ($W_y >> W_z$). Basic to this is the observation that in the case of non-integral but rational values of the perameters $h_z$ in equation (1) a multiple self imaging process is obtained. For illustration let it be assumed that $h_z = p/q$, where $p$ and $q \neq 1$ and have small integral and relatively prime number values (no common divisor). In practice this can be achieved, for example, simply by suitable choice of the length L of the waveguide, because the quantity $h_z$ is proportional to L. Then the rays (FIG. 26) coming from an object point A do not unite into a single point (as is the case when $h$ is an integer), but normally form $q$ separate image points.

If the object to be imaged is not point-like, but extended, then correspondingly each point of the object is imaged $q$ times. As a result there may be a multiple coverage of the image plane $x = L$ with image points. For the sake of simplifying the description it is therefore appropriate if the cross section $W_z$ of the waveguide in the z-direction is subdivided into $q$ partial regions of equal width (FIG. 27). Each partial region occupies equally large surface portions of the entry plane ($x = 0$) and the exit plane ($x = L$) of the waveguide, which regions may be defined as entry "windows" and exit "windows". Thus, each of these windows has the width $W_z/q$, and in the y-direction its dimension $W_y$ is very large compared with the thickness of $W_z$ of the guide, which in the here considered example is a thin film waveguide. The entry windows and the exit windows are respectively numbered individualy in the z-direction as $E_1 \ldots E_q$ and $A_1 \ldots A_q$. The multiple imaging process can be described as follows:

(a) Each entry window is fully imaged upon each of the exit windows. In the here described example of a thin film waveguide with parallel walls the imaging is effected on the scale 1:1. The $q$ images of a single entry window, for example $E_1$ in FIG. 27, thus cover the total cross section of the waveguide in the exit plane.

(b) The images originating from one entry window and appearing in successive exit windows $A_1 \ldots A_q$ are alternately erect and inverted (see FIG. 27). In fact the image produced by the entry window $E_1$ is erect in the exit window $A_j$ if the quantity $(i+j+pq)$ is an even number, whilst if $(i+j+pq)$ is an odd number an inverted image will appear.

(c) If light enters only a single entry window then the images in all the exit windows have the same intensity. Corresponding image points in the different exit windows are coherent with respect to each other, even in the case of an entry image which is incoherent in time and space. However, certain phase differences exist between the individual exit images. These depend both upon the position of the entry window and the exit window and are always multiples of $2\pi/q$.

(d) If light enters simultaneously several of the entry windows then each of these entry windows produces, independently of the others, its own image in each of the exit windows. The image resulting in a particular exit window is then the superposition of the images (erect and inverted) of all of the entry windows. If fixed phase relationships exist between the entry windows then the phase differences mentioned under paragraph (c) are to be considered in this superposition.

(e) In a thin film type of waveguide, whose thickness continually expands or contracts (for example is of wedge form) in the propagation direction of the light, it is possible to define corresponding entry windows and exit windows, because the regions $0 < z < W_0$ and $0 < \lambda z < W_L$ of the film type waveguide can be subdivided into $q$ equal partial regions in the plane $x = 0$ and $x = L$. In this case $W_0$ and $W_L$ are the film thickness of the waveguide at $x = 0$ and $x = L$. The exit windows are therefore larger than the entry windows by the magnification factor $\mu = W_L/W_0$, and all the images are magnified by the same factor (or are demagnified if $\mu < 1$). Apart from this however all the characteristics enumerated under paragraph (a) – (d) apply to these waveguides. The effective transverse dimension for imaging condition according to equation (1) is again provided by equations (35) and (36).

The properties here enumerated may be understood by a more detailed consideration of the theory set forth in equations (5) to (24). However, a qualitative discussion is also possible on the basis of the theory of optical self imaging of periodic objects as is described, for example, by Winthrop and Worthington (Journal of the Optical Society of America, volume 55 (1965) page 373), and by others cited by these authors.

In the following there will be given various possibilities of multiple imaging with a non-integral value of $h$.

6. Beam division by means of thick film waveguides

Figure 28B:
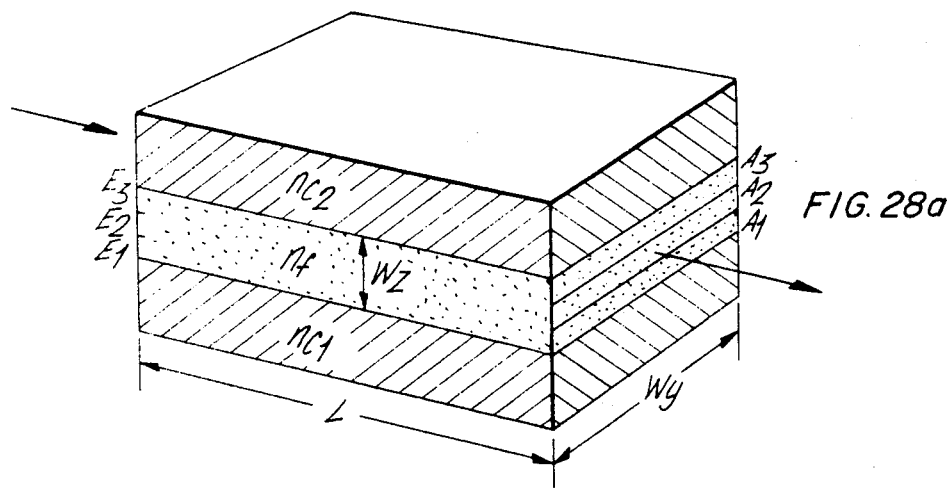
Figure 28B:
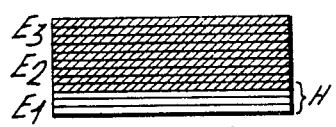

FIG. 28 shows in perspective a self imaging beam divider for such optical waveguides of the film type, in which the light distribution normal to the layer plane represents the transmitted image. Such a waveguide with the thickness $W_z$ is necessarily a "thick" waveguide of the film type, $W_z >>> \lambda$, because the number of modes existing therein must be at least equal of the number of image points to be transmitted. FIGS. 28(b) and (c) show schematically the form of such images. Each image consists of a number of strips of different brightness parallel to the layer, which together represent some form of one dimensionally parallel arranged information. Each strip can contain its information in analog or digital coded form. The analog representation, for example of a sound frequency spectrum would be so established that each strip of the image is associated with a definite sound frequency, and that the brightness of the strip corresponds to the sound intensity at the respective frequency. As an example of a digital representation of the information, each strip may correspond to one bit of a binary number. Thus a bright strip could indicate a binary "one" (L), and darkness at the location of a strip could indicate a binary "zero" (0). In this manner a one dimensional image can represent a "word" or an "instruction" of a computer. For example, the "image" H shown in FIG. 28(b) could, when read upwardly from below, represent the binary number LLL0.

Figure 28C:
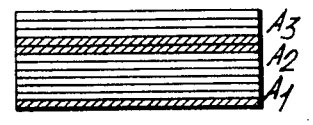

If now such an image H is presented at one of the previously defined "entry windows" $E_1 \ldots E_3$ of a waveguide having a fractional value of $h = p/q$ (FIG. 28(b)) then real images of the image H will appear in all the $q$ exit windows $A_1 \ldots A_3$ at the other end of the guide section. These images are illustrated in FIG. 28(c) for the case $h = \frac{1}{3}$. The input and output of the various images can be effected through a suitable number of flat optical waveguides of the film type, which are pressed or cemented against the corresponding "windows" at the end faces $x=0$ and $x=L$ of the waveguide.

The dimensions $W_z$ and L of the waveguide are, in accordance with equation (1) decisive for the self imaging parameter $h$ of the waveguide. On the other hand the width $W_y$ is irrelevant for this application of the imaging process. The width has, at most, an influence upon the light power transmittable in each strip.

Furthermore it should be observed that a symmetrical structure of the waveguide ($n_{c1} = n_{c2}$) is advantageous for the imaging quality of the beam divider. If the demands upon this quality are somewhat relaxed when an asymmetrical structure ($n_{c1} = n_{c2}$) is still usable.

7. Beam division with thin film waveguides

A one-dimensional image in an optical waveguide of the film type can also be so arranged that the individual image points come to lie adjacent each other (instead of being one on top of each other) in the thickness of the film. As compared with the case described in the preceding paragraph the image is therefore rotated through 90°.

Figure 29B:
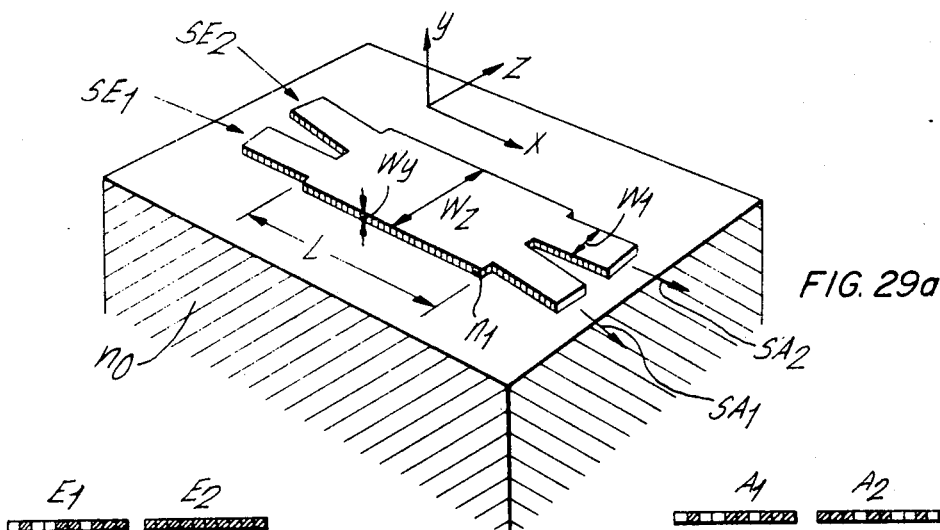

The thin film type of waveguide already described with reference to FIG. 11 is suitable for the multiple imaging and beam division for the purpose of this type of unidimensional image, and this example is again represented in FIG. 29 for the application now in question. The differences as compared with FIG. 11 consist in the altered dimensions $W_z$ and L, in fact so that in this case $h=p/q$ is a fraction number. The refractive index profile of the film type waveguide can take any one of the forms shown in FIG. 12. At the end faces $x=O$ and $x=L$ of the film type waveguide there are respectively connected to the beam divider a number $q$ of optical strip guides of width $W_1$. These serve for the input and output of the images. Their thickness is preferably equal to the thickness D of the beam divider so that they can be produced with the beam divider in one manufacturing procedure (for example photolithography). For the example of FIG. 29 the value $q=2$ was adopted, but it is also possible to employ considerably greater values of $q$. It will be assumed that one of these strip guides (for example $SE_1$ in FIG. 29) delivers light to the beam divider in such a manner that a one-dimensional image appears in the plane $x=O$. This may be achieved, for example, by arranging that the strip guide $SE_1$ is itself a self imaging guide, which forms at $x=O$ an image originating from another source. It will further be assumed that the light coming through the strip guide $SE_1$ is guided only in a single one of the possible modes which can exist in the Y direction, for example $m_Y$. This condition is certainly fulfilled when the film thickness D is so small that only a single mode exists in the y-direction. The strip guides $SE_2 \ldots SE_q$ are assumed to carry no light. An example of the light distribution then existing in the plane $x=O$ is shown in FIG. 29(b). The digital image in the guide cross section or window $SE_1$ represents here the 10-place binary number 1011001000.

The self imaging strip guide now function as a beam divider and divides this image into $q$ equal images in the plane $x=L$, if its width $W_y$ and its length L are so selected that the imaging perameter ca'culated according to equation (1) is $h_z=p/q$ where $p$ is any integer which is prime relative to $q$. Therefore in the example of FIG. 29 it is possible to have $h=\frac{1}{2}$, 3/2, 5/2. For the refractive index $n_1$ of the conductor appearing in equation (1) it is obviously necessary in the here described example again to substitute the effective refractive index of the film guide appropriate to the mode $m_Y$ which is employed, this index being determined from the refractive indexes $n_1$ of the film material, $n_0$ of the substrate and, if necessary, of any covering material over the film guide, as well as from the thickness D of the film and the polarisation of the guided light.

Figure 29B:
Figure 29C:
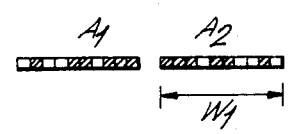

The resulting images at $x=L$ are shown in FIG. 29(c). By means of the waveguides indicated at $SA_1$ and $SA_2$ of FIG. 29(a) they are relayed for further use in the integrated optical circuit. Appropriately the waveguides $SA_1, SA_2 \ldots SA_q$ are again self imaging film type waveguides.

As here described each of the strip guides $SE_{1,2}$ and $SA_{1,2}$ can guide several modes in the z-dimension. In the example of FIG. 29 there must be at least ten because each image should contain ten image points. It is however preferable for the purpose of distortionless imaging of the binary images, to choose the width $W_1$ of the ribbon conductor to be so great that the number of possible modes in the z-direction is substantially greater than the number of image elements to be transmitted. Conversely, however, the beam divider according to FIG. 29(a) can obviously be used also in cases where the strip guides $SE_{1,2}$ and $SA_{1,2}$ are able to carry only a single mode because of the very small dimension of its width $W_1$. The beam divider will then simply divide the light power received in one branch thereof uniformly over the two oppositely situated output branches. In such a case it satisfies precisely the same function as a known type of directional coupler (Bell System Technical Journal 48 (1969) page 2059). The division ratio is here 3dB. In comparison with the known type of directional coupler, the beam divider according to FIG. 29(a) is simpler to produce because in the latter case the extremely critical coupling gap between the strip conductors is lacking.

8. Superimposing of images

FIG. 30 shows schematically a self imaging beam divider with a rational-fractional parameter $h$ for the opto-electronic implementation of the logic functions "AND" and "OR". Furthermore FIG. 30 demonstrates the possibility of effecting simultaneously with the beam division an optical magnification by means of the film type waveguide, and finally there are shown two different methods of input and output of the optical images.

The structure of this beam divider corresponds in principle to that shown in FIG. 29. However, for the purpose of simplifying the drawing, FIG. 30 shows only a plan view on the film type waveguide with its inputs and outputs. The substrate has been omitted from the drawing. The introduction of the two input images U and V is here effected in such a manner that for each image point ("bit") there is provided an individual narrow (single-mode) strip guide. The arrangement of corresponding bits in the inputs images U and V is selected to be mirror-symmetrical, and the condition is set that the light input to each of the individual strip guides is normalised to the same value $P_0$ by the use of suitable limiters. The light beams should all possess about the same frequency but they should not be coherent.

The dimensions of the beam divider are again dimensioned according to equation (1) with a half-integral value $h_z$. Accordingly to satisfy equation (36) there is to be selected for $W_{eq}$ the geometrical mean value $(W_0 \cdot W_1)^{\frac{1}{2}}$ from the widths of the beam divider at $x=O$ and at $x=L$, and $n_1$ again indicates the effective refractive index of the particular mode used in the beam divider. Under this condition the light input arriving in the strip guide $u_1$ is imaged in the proportion of one half at each of the positions indicated by $S_1$ and $D_1$ and, stated in more general terms, the light from the strip guide $u_j$ is similarly imaged at the positions $S_j$ and $D_j$, taking $j = 1 \ldots n$. In a similar manner, however, the light input arriving in the strip guide $v_j$ will also be imaged at the positions $S_j$ and $D_j$. Thus, at each of the positions $S_j$ and $D_j$ there will appear the light intensity $(u'_j + v'_j)/2$, in which case the intensities $u'_j$ and $v'_j$ will in each case by 0 or 1 in relation to the normalised power $P_0$. At the $2n$ positions $S_j$ and $D_j$ there may be situated identical light detectors, for example in one of the wellknown forms (Stillman et al in Applied Physics Letters 25 (1974) page 36). The electrical signals produced by the detectors are each delivered into $2n$ trigger circuits T, which only respond upon a certain threshold being exceeded, whereupon they themselves transfer a signal. If now at the detectors at the positions $S_1 \ldots S_n$ the trigger threshold value is adjusted to between $P_0/2$ and $P_0$ (e.g. 0.75 $P_0$), then a trigger circuit at the position $S_j$ will only respond when $u'_j = 1$ AND at the same time the appropriate $v'_j = 1$, because in that case $(u'_j + v'_j)/2 = 1$. The electrical "image" appearing at the n-conductors at S in FIG. 11 thus represents, bit for bit, the logical AND linkage of the two digital optical "images" U and V. In a completely corresponding manner the logical OR linkage is obtained simultaneously at D if the threshold value of the trigger circuits at the positions $D_1 \ldots D_n$ is adjusted to a finite value below $P_0/2$, for example $0.25 P_0$.

In this arrangement the use of a magnifying beam divider is of advantage because this makes possible the use of somewhat larger detectors. Thus, if one starts on the basis of a possible mean spacing distance between detectors of $10\mu m$, it will be possible to arrange 16 detectors over a width of $W_L = 160 \mu m$. For a four-fold magnification of the beam divider $W_0 = 40 \mu m$, and if $n_{eff} = 1.60$ the necessary length for $n = \frac{1}{2}$ is $L = 32$ mm, when red light ($\lambda = 0.633 \mu m$) is employed for the imaging. The thin film type waveguide with the necessary value $n_{eff}$ may be produced, for example, from a glass film having a thickness of $D = 0.5\mu m$, which is applied by cathode sputtering of flint glass ($n_1 = 1.66$) onto a glass substrate having an index $n_0 = 1.50$. For the $2 \times 8$ strip conductors $u_j$ and $v_j$ it will then suffice to have a width of, for example, $W_1 = 1\mu m$ (see FIG. 30) and their centre to centre spacing distance would amount to $2.5\mu m$. Given a starting width of $W_0 = 40\mu m$ the beam divider can carry about 70 modes in the z-direction. Therefore more than 4 modes are available for the transmission of each image point, and the image distortions are correspondingly small.

A magnifying waveguide may be created by increasing the cross section continuously in the direction of propagation as is shown in FIG. 30. The magnification corresponds to the ratio of the dimensions at the end and start of the waveguide.

9. Image processing

The previously discussed applications of self imaging film type waveguides can all operate with spatially and temporally incoherent light. By the use of coherent light, a self imaging film type waveguide having a half-integral imaging parameter ($h = \frac{1}{2}, 3/2, 5/2 \ldots$) offers the simple possibility of splitting a one-dimensional image into its symmetrical and anti-symmetrical components. This possibility is illustrated schematically in FIG. 31. Similarly as in FIG. 30 there is here shown only a plan view of a thin film type waveguide. Departing from the practice in the other drawings the $x$ axis of reference is here exceptionally shown displaced into the centre of the film conductor so that its width extends from $z = -W_z/2$ to $z = +W_z/2$. At the same time x axis separates the two input windows $E_1$ and $E_2$ and likewise the output windows $A_1$ and $A_2$.

There may now be projected onto the input plane $x = O$ of the film conductor a spatially coherent unidimensional image having the width $W_z$. Let the complex amplitude distribution in this image be $f(z)$. Then, by the application of a known principle, it is always possible in the case of any chosen function $f(z)$ to express this function as the sum of a symmetrical function $s(z)$ and an antisymmetrical function $a(z)$ $$f(z) = s(z) + a(z)$$

$$S(z) = s(-z)$$

$$a(z) = -a(-z)$$

The transmission of the image components of the regions $z > O$ and $z < O$ through the waveguide having $h = \frac{1}{2}$ is represented in FIG. 31(a) by the open arrow. The partial image ($z < O$) from the input window $E_1$ is imaged erect onto the output window $A_1$, but inverted onto the output window $A_2$. The images at the output windows $A_1$ and $A_2$ are coherent, and the phase of the latter ($A_2$) leads the first one ($A_1$) by 90°. In a wholly corresponding manner there is effected the imaging of the partial image ($z > O$) incident upon the input window $E_2$, represented in FIG. 31(a) by the solid arrow. The mentioned phase shift of 90° is derived from the theory and was confirmed experimentally.

In the arrangement for image splitting shown in FIG. 31(b), a delay element PS is inserted in the plane $x = O$ in front of the input window $E_1$, which imparts to the lower partial image a phase displacement $\Delta\psi = -90°$ in relation to the upper component image. By this means the corresponding partial images in the output windows $A_1$ and $A_2$ (open arrows) are also delayed by 90° and they oscillate exactly in phase or in opposite phase with respect to the partial images proceeding to the output from the input window $E_2$. FIG. 31(b) shows in particular the transmission of the symmetrical image partial $s(z)$. The partial images of the function $s(z)$ incident upon the input windows $E_1$ and $E_2$ are mirror-symmetrical and (in front of the delay element) oscillate in the same phase. In the output plane these partial images overlap in the same phase in window $A_2$, but in opposite phase in the window $A_1$. Accordingly there will appear in the window $A_2$ the symmetrical image component of the function $s(z)$, whilst the window $A_1$ remains dark. In the case of the antisymmetrical image partial according to function $a(z)$ both of the partial images oscillate in opposite phase in the input plane. Accordingly they extinguish each other in the output window $A_2$, but interfere constructively in the window $A_1$. Consequently the general image of the function $s(z)$ is split into its components according to functions $s(z)$ and $a(z)$, and these components appear spatially separated in the windows $A_2$ and $A_1$. It is clear that the method explained here for image splitting for the case of a thin strip guide ($W_y << W_z$) can also function with rectangular guides and with thicker strip guides, wherein $W_y$ and $W_z$ are comparable or satisfy the condition $W_y >> W_z$.

It remains to provide data concerning the delay element. In the case of a thin strip guide a relay of 90° can be achieved, for example, by making the thickness of the film guide of FIG. 31(b) somewhat greater in the hatched region (in the y-direction normal to the plane of the drawing) than it is in the remaining region. This causes the phase velocity in the hatched region to be reduced and the light is somewhat delayed. A numerical example shows that the dimension $\Delta x$ of the hatched region in the x-direction can be so short that this causes no substantial impairment of the image. For example, in the case of the thin film guide discussed in connection with FIG. 29, a delay of 90° may be achieved by increasing its thickness from its normal value of $D_0=0.5\mu m$ by an amount $\Delta D=0.02\mu m$, this being effected over a length of the order of magnitude $\Delta x=100\mu m$.

10. Switches, modulators and isolators with beam dividers

Proceeding upon the above described principle of image dissection, it is possible to derive a particularly simple form of an image conserving modulator for integrated optics. For this purpose it is convenient to consider again the arrangement according to FIG. 31(b) and to assume that, for example, a symmetrical image is incident upon the input plane $x=0$. At the output there then appears an image only in the window $A_2$, that is to say at the side opposite to the delay element. If the delay element were to be arranged not at the input window $E_1$, (i.e. $z<0$), but instead at the window $E_2$ (i.e. $z>0$), then the output image would appear at the window $A_1$ and the window $A_2$ would remain dark. The same effect may, however, also be achieved by arranging that the phase shift of the delay element is changed through 180°. From this it is clear that by the replacement of the constant phase shifting delay element by a variable phase shifting arrangement, for example an electric variable phase shifter, the arrangement according to FIG. 31(b) may be converted into a switch or amplitude modulator.

By varying the phase shift through 180° it is possible to switch over the output image from one output window to the other. For intermediate values $\Delta\psi$ of the phase shift, the intensity of the two output images will vary according to $\cos^2(\Delta\psi/2)$ and $\sin^2(\Delta\psi/2)$. In order to produce from any given general image the symmetrical input image required for this modulator, it is appropriate to employ a second arrangement as in FIG. 31(b), but in the reverse direction. In fact, if a chosen image is projected from the righthand side onto the window $A_2$ and the window $A_1$ remains dark then there will be obtained in the windows $E_1$ and $E_2$ two similar, symmetrically situated output images of the same phase, that is precisely the input image required for the described modulator.

A more thorough consideration of the modulator principle just described shows that it is possible to omit the fixed delay members. One then obtains the simplified arrangement shown in FIG. 32(a). This consists of two self imaging waveguides with the imaging parameter $h_z=\frac{1}{2}$, which serve for beam division and recombination. Between them there are situated the two waveguide sections indicated by $M_1$ and $M_2$. For at least one of these the phase displacement $\Delta\psi$ between the planes $x_1$ and $x_2$ is arranged to be externally controllable. This control can be effected in various known manners, for example by the electro-optical effect by applying an electrical field to the waveguide, by varying the temperature so as to use the temperature coefficient of the refractive index, by the application of mechanical stresses so as to use the piezo-optical coefficient, or by causing optical or electronic changes to be induced in the density of free charge carriers in the wave conductor. In the first place it will be assumed that both of the waveguide sections $M_1$ and $M_2$ are so designed that they are self imaging (integral parameter $h_M$) and that no phase difference exists between them. Then the entire arrangement according to FIG. 32(a) will function like a one-piece self imaging waveguide with the perameter $h=(h_M+1)$ and the width $W_z$. For $h_M=1$ for example, an image projected onto the input window $E_1$ will appear at the output at the window $A_1$, and an image projected at the window $E_2$ will appear at the window $A_2$. If now the waveguide sections $M_1$ and $M_2$ serving as phase modulators are so actuated that there exists between them a phase difference of $\Delta\psi_1-\Delta\psi_2=180°$, then the positions of the two output images will interchange. The arrangement is therefore a switch or, when operating the phase shifters with other phase differences, an amplitude modulator. On account of the existence of the self imaging characteristic of the waveguide sections $M_1$ and $M_2$ the arrangement is image-conserving. A more thorough analysis shows that their utility is not restricted to spatially coherent light.

Figure 32A:
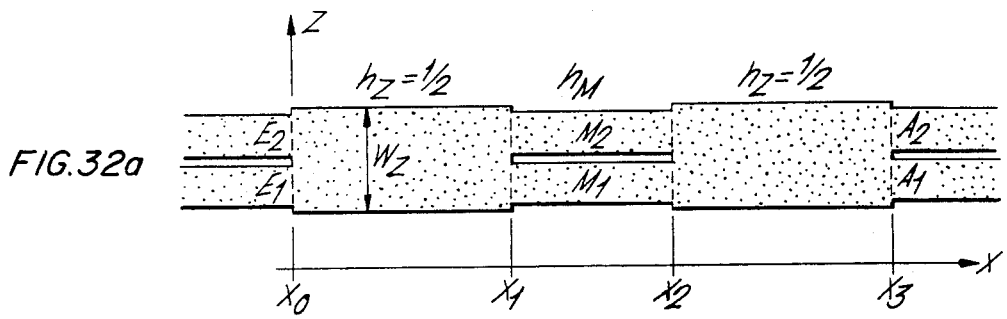

The arrangement according to FIG. 32(a) can advantageously also be modified to provide an optical isolator, this being achieved by designing one of the two inner waveguide sections (for example $M_1$) as a non-reciprocal optical element, i.e. in particular by making this element of a magneto-optical material of such orientation and length that the optical path length through the waveguide section $M_1$ in the forward and reverse direction differ from each other by one half of a wavelength. The entire arrangement between $x_0$ and $x_3$ then functions as an isolator. For example, considering the forward direction, when light fed in at the input window $E_1$ emerges at the output window $A_1$ then, for the reverse direction, light fed in at the window $A_1$ would not reappear at the window $E_1$ but instead at the window $E_2$. In this case of an optical isolator (or one-way guide) it is necessary that the inner waveguide section shall not be externally controlled, but a unidirectional magnetic field must be applied to the non-reciprocal strip conductor $M_1$ and must have such magnitude that the optical path lengths through $M_1$ in the forward and reverse directions differ from each other exactly by one half of a wavelength.

Figure 32B:
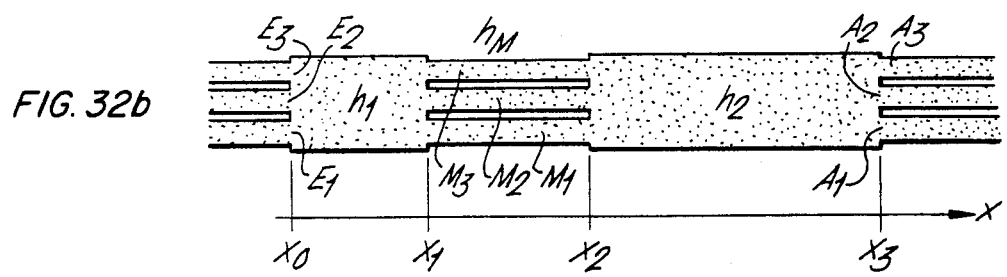

The described arrangement according to FIG. 32 can be generalised from the case of serving for switching between two channels, to serve for a larger number $q$ of channels. FIG. 32(b) shows an example of a switch for $q=3$ channels. In the case where $q$ is a general number it is necessary for the first beam dividing waveguide $(x_0-x_1)$ to be so designed that it divides q-times and the second wide waveguide must again superimpose the $q$ images in correct phase. This can be achieved by selecting the imaging parameters as $h_1=p_1/q$ and $h_2=p_2/q$, so that $h_{12}=(h_1+h_2)$ is an integer. In between there are situated $q$ controllable phase shifters in the form of the waveguide sections $M_1 \ldots M_q$. These are all self imaging and of like phase so that the entire arrangement again functions like a single waveguide with the perameter $(h_{12}+h_M)$, so that, for example, when this is an even number, each input window $E_j$ will image upon the corresponding output window $A_j (j=1, 2 \ldots q)$. If now the phase shifters are controlled in a suitable manner the result can be obtained that some, or all, of the $q$ output images can be interchanged with each other. A more precise analysis of the problem shows that it is even sufficient to employ only $q-1$ of the $q$ phase shifters, and to obtain in this manner any cyclic permutation of the output images. In particular it is also possible to supply an image at only one of the $q$ input windows and then to switch this to any desired one of the $q$ output windows. The phase differences of the phase shifters necessary for a desired switching configuration may be calculated by the solution of a linear equation system. These coefficients are determined by the previously mentioned phases of the images in the output windows, which themselves can be calculated from the already mentioned theory of self-imaging of periodic structures.

The above mentioned condition of an integral value of $h_{12}$ is not compulsory, but was used to permit a particularly clear explanation of FIG. 32(b). It essential, however, that for $h_1$ and $h_2$ the same denominator $q$ is used and that the numerators $p_1$ and $p_2$ are relatively prime to $q$.

The components described with reference to FIG. 32 can again be constructed with thicker strip waveguides. Of particular interest is the possibility that $W_y \approx W_z/2$. In this case the four optical guides connected at $E_1$, $E_2$ and $A_1$, $A_2$ may be round glass fibres and may be of single mode or even multiple mode. However, the beam dividing waveguide sections $(x_0-x_1)$ and $(x_2-x_3)$ imaging connecting sections $M_1$ and $M_2$ must be of square cross section. Such a switch/modulator is of advantage even if the round multiple mode glass fibres transmit no images, but simply carry light energy in a number of different modes. Because a modulator or isolator according to FIG. 32 operates in an image-conserving manner at least in z-direction, it is properly suited for operation between such energy transmitting multiple mode glass fibres. In the case of the above mentioned design with condition $W_y \approx W_z/2$ the system is also self imaging in the y-direction and the round end faces of the fibres $E_1$,$E_2$ and of the fibres $A_1$,$A_2$ are imaged mutually upon each other.

11. Beam dividers with unequal division ratio

Figure 33A:
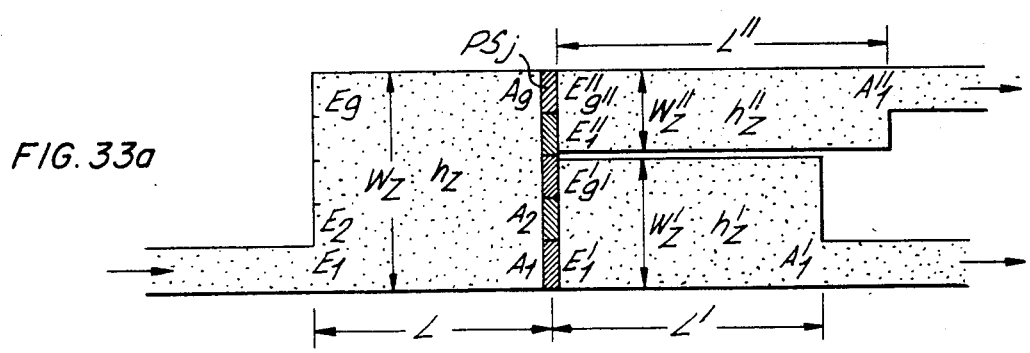

The beam divider described with reference to FIG. 29 divides the input image into a plurality of output images of equal intensity. However, for many applications beam dividers are required having unequal division of the intensity. FIG. 33(a) shows schematically the manner in which such a beam divider can be constructed of self imaging waveguides. In the example here represented the division is effected in the ratio 3:2. In the general case it is possible to effect a division of the input image at the window $E_1$ onto the output windows $A_1'$ and $A_2''$ in any desired widely different intensity ratios $q':q''$, wherein $q'$ and $q''$ are small relatively prime integers. The beam divider must then according to FIG. 33(a) consist of three waveguide sections, whose widths $W_z$, $W_z'$ and $W_z''$ stand in the relationship to each other of $(q'+q''):q':q''$. Their lengths $L$, $L'$ and $L''$ must, in accordance with equation (1), be so selected that the corresponding imaging parameters amount to $h=p/(q'+q'')$, $h'=p'/q'$ and $h''=p''/q''$, with $p$, $p'$ and $p''$ being any integers. The simplest possibility is $p=p'=p''=1$.

The mode of functioning of this beam divider is now evident. The first waveguide divides the incoming image into $(q'+q'')$ sub-images, of which each one possesses only the $(q'+q'')$th part of the original intensity. A number $q'$ of these sub-images is reassembled by the waveguide ($W'_z$,$L'$) to form a single image at the output window $A'_1$, and the remaining $q''$ sub-images are united by the waveguide ($W''_z L''$) at the output window $A''_1$. In this case the intensity of the output images is proportional to the number of sub-image which are combined, and therefore corresponds to the desired division ratio $q':q''$. A condition for the full recombination, for example of $q'$ sub-images singly in the output window $A'_1$ is that certain definite phase differences exist between the input images at the windows $E'_1 \ldots E'_{q'}$ of the waveguide of width $W'_z$. These phases may be calculated backwards by projecting an image back onto the window $A'_1$ from the righthand side in FIG. 33(a) and observing the phases of the images formed at $E'_1 \ldots E'_{q'}$. These phase differences which are necessary at the windows $E'_j$ do not normally coincide with those which exist between the images at the output windows $A_j$ of the first waveguide. Consequently it is necessary for the functioning of the beam divider to insert, between each window $A_j$ and the corresponding window $E'_j$ or $E''_j$, a suitable fixed phase shifter $PS_j$, which produces the above mentioned phase differences. The production of such phase shifters has already been discussed above.

Figure 33B:
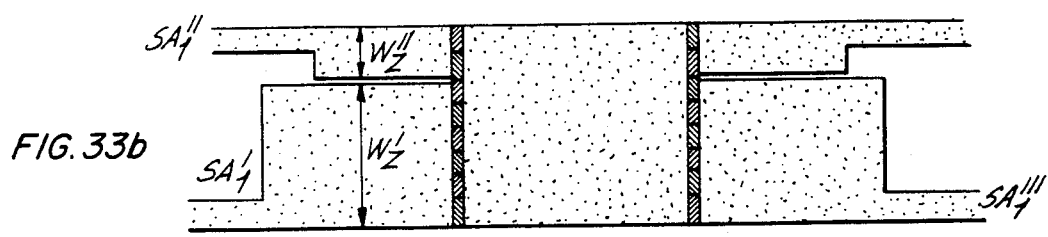

In FIG. 33(b) there is shown a still further version of a beam divider with unequal division. Contrasted with that in FIG. 33(a), this arrangement (including the phase shifters) is fully symmetrical with reference to the forward and backward proceeding light fluxes. Again the division ratio is determined by the relationship of the widths of the waveguides $W'_z:W''_z$. Such an arrangement is suitable, for example, for output coupling from a strip guide-laser. In this case the laser-resonator consists simply of the arrangement according to FIG. 33(b), in that the two guides $SA'_1$ and $SA''_1$ are each terminated by means of a highly reflecting mirror, or are connected together by means of a suitable waveguide (ring laser). Output coupling out is effected in the example here shown by means of the further strip conductor such as $SA''_1$.

12. Star coupler

Most of the self imaging waveguides in the arrangements described in the foregoing paragraphs allow of direct generalisation from one-dimensional to two-dimensional imaging. A further example of this is the following application of self imaging to the improvement of the so-called "star" coupler.

One of the possible concepts for small optical information transmission systems is the star-arrangement of all of the subscribers which are to be connected together. In this arrangement a light conducting glass fibre (or a bundle of such glass fibres) is taken from each subscriber to a common star point, at which all these lines are connected together. A coupler for this purpose (see. M. C. Hudson and F. L.Thiel, Applied Optics Vol. 13 (1974) page 2541) consists essentially of a short piece of glass rod, one of whose end faces is provided with a mirror surface, and against whose other end face the glass fibres to be connected are pressed. The cross sectional shape (round) and the ratio of length: diameter = about 7:1 of the glass rod were found by empirical methods to be practicable.

In the present case the introduction of a two-dimensional self imaging waveguide makes possible a marked improvement. FIG. 34 shows an example of a waveguide of square cross section consisting of a transparent material (e.g. glass) whose index approximates as far as possible the index of the fibre cores. The thickness and the length L of the waveguide are so selected that the imaging parameter according to equation (1) has the value $h = \frac{1}{8}$. The end faces of the waveguide are arranged precisely normal to its axis, and the rear end face SP in FIG. 34 is rendered reflecting. In consequence of the reflection at this surface, the guide section used in the reflection mode in the star coupler functions like a guide section of double the length when used in the transmission mode, that is to say with the parameter $h = \frac{1}{4}$. Corresponding to this the multiplicity $q$ of the imaging is 4 in both y and the z-direction and therefore the non-reflecting end face contains sixteen windows, which serve at the same time for input and output. At each of these windows there is centrally mounted a glass fibre G. In such a case the waveguide then images the core of each individual fibre exactly upon the core of all the other fibres. Thus, this imaging star coupler is free from the so-called "packing loss" of about 60%, which takes place in the known couplers by reason of the fact that the light reappearing out of the glass rod is also incident upon the claddings of the glass fibres as well as upon the intermediate spaces between the fibres. Therefore the self imaging star coupler according to FIG. 34 can feed in to each of the outgoing fibres an intensity which is higher by the factor 2.5 as compared with a non-imaging coupler.

A numerical example will better illustrate the imaging star coupler. In order to accommodate 4×4 fibres of 70μm external diameter, it is necessary for the end face of the waveguide to measure about 300μm×300μm. In order to satisfy the condition $h = \frac{1}{8}$, and if $\lambda = 0.9$μm and $n_1 = 1.55$, the conductor length L = 7.75cm results. By the use of a waveguide, which converges in a direction from the input/output surface towards the reflecting end face, it is possible to shorten the length L.

Therefore in the case of the imaging coupler the fibres need not be arranged with the closest packing, and, in particular their claddings do not require to be thinned by etching. Nevertheless a tight packing is quite possible and is even technically advantageous. In such a case it is then more favourable to employ a triangular or hexagonal cross section instead of the square conductor cross section because then the hexagonal symmetry corresponds to the closest packing. The invention is not restricted to the above described applications of beam division to self imaging. On the contrary, there exist the following more general possibilities for realising an application of the method.

13. Waveguide material

The suitable materials for the self imaging waveguides are solid, liquid and gaseous materials which are sufficiently transparent at the employed wavelength. Furthermore it is possible for the core of the waveguide to be empty (vacuum) (region $n_1$ in FIG. 26). In each case it must be ensured that reflection takes place at the walls of the waveguide, whether this be a total reflection ($n_0 < n_1$) a Fresnel reflection ($n_0 > n_1$) or a metallic reflection ($n_0$ complex). Obviously also double refracting materials are suitable as waveguide materials if they are suitably oriented. The refractive indexes should be homogeneous as far as possible.

14. Beam division of other wavelengths

The described self imaging systems are based upon geometric-iotical principles and are therefore not restricted to visible light, but are suitable for electromagnetic radiation of all wavelengths, for which a waveguide can be constructed, whose operation depends upon repeated reflection at the walls. In particular it is possible, for example, to construct the self imaging system for X-rays and thereby to create two (or more) mutually coherent Rontgen images.

15. Shape of the ends

Figure 35A:
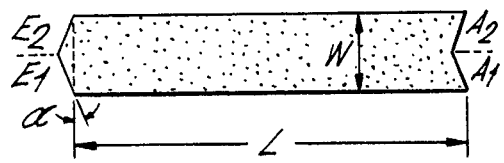
Figure 35B:
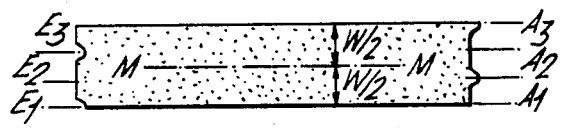

The ends of the beam dividing waveguide do not require to be cut to such blunt and rectangular form as was always assumed in the foregoing discussion. Because the self imaging process images the total volume of the waveguide onto another volume situated at a distance $L_h$, it is also possible that inclined or irregularly cut ends will be suitable, as is already shown in FIG. 5 for singly self-imaging guides. In the case of a multiple imaging process, the inclination or curvature of all of the output windows must correspond precisely to those of the input windows, and in fact so that each point of an output window has in the x-direction the same spacing distance $L_h$ from the corresponding point of all the input windows. This is shown in FIGS. 35(a),(b). The case illustrated in FIG. 35 is where $h = \frac{1}{8}$, which is representative for all cases $h = p/q$ where the product $pq$ is even. In this case the imaging of the input window $E_j$ on the corresponding output window $A_j$ is erect and the end faces at $x = 0$ and $x = L$ lie parallel to each other. In FIG. 35(b) however the case where $h = \frac{1}{3}$ is illustrated, which provides an inverted image on account of the odd product $pq$. In this case the end surfaces of the waveguide must lie symmetrically to each other in relation to the centre plane MM of the waveguide.

Figure 35C:
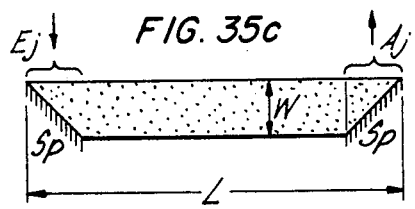
Figure 35D:
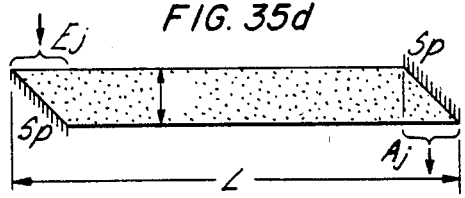
Figure 35E:
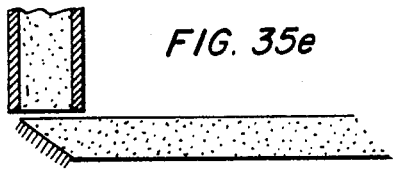

With greater inclination of the end faces, in particular with $\alpha = 45°$ there results a new and practically interesting form for the ends of the waveguide (FIG. 35(c)). In this case the end surface is so markedly inclined that all of the light capable of being propagated in the waveguide is reflected out from the end face laterally of the waveguide. This case is shown in FIGS. 35(c),(d) for a one-dimensional self imaging waveguide of the layer type. A corresponding shape is naturally also possible in all of the two-dimensional self imaging waveguides (FIGS. 36–39). The reflections taking place at the end faces $S_p$ inclined at 45° in FIGS. 35(c),(d) has the effect that output window and input window $A_j$ and $E_j$ respectively of the waveguide lie in the side walls thereof. This effect is of advantage for many applications. In FIG. 35(c) all of the windows lie in a side wall. In FIG. 35(d) the windows lie in two opposite side walls. In this arrangement because the light enters and leaves the layer waveguide through the side walls, it is possible to employ the shape of the ends in FIGS. 35(c),(d) as a novel coupler, which fulfills similar functions to those of the prism and grating couplers well known in the art of integrated optics. However, in contrast to the latter the arrangement according to FIGS. 35(c),(d) is capable of coupling an entire image into the waveguide (i.e. a great many modes simultaneously). In particular it is suitable in this form for the high efficiency coupling of a multiple mode glass fibre to a multiple mode layer guide or strip guide (FIG. 35(e)).

The reflection at the inclined ends of the waveguide can be a total reflection if a sufficiently high discontinuity of the refractive index exits at the end face. Alternatively the end face may be rendered reflecting metallically (for example by means of silver or aluminium), or it can be in the form of a holographically designed Bragg reflector.

16. Reflection-beam dividers

With the exception of the star coupler all the previously described beam dividers operate by the process of transmission, i.e. the input windows and output windows are situated at opposite ends of the waveguide and have the spacing L. It should, however, be mentioned that it is quite possible to construct equivalent beam dividers for operation in reflection. For example, the beam dividers according to FIGS. 28 and 29, as well as many of the arrangements derived therefrom (for example FIGS. 31, 32(a), 33(b)), can be split at the centre of their length L, and after the insertion of mirrors at the splitting surfaces each of the two resulting halves can be operated individually in reflection. There is then obtained the same effect as was obtained previously in transmission. The input windows and output windows then coincide with each other, and the length to be inserted in equation (1) is double the spacing of these windows from the reflecting splitting surface.

The mirror to be applied to the splitting surface can be metallic, or a dielectric Bragg reflector including the limiting case of dielectric multiple layers. Other alternatives are a prism functioning as a cube corner reflector, or a simple 90° roof prism or, for use in a strip waveguide according to FIG. 29, the two-dimensional equivalent of the roof prism.

17. General cross sectional shapes

The theory of self imaging of periodic structures is, as already mentioned, applicable to two-dimensional self imaging waveguides. This theory allows an answer to be found to the question of the possible cross sectional shapes of two-dimensional self imaging optical waveguides of homogeneous reflective index $n_f$. The theory demonstrates in fact that each regular two-dimensional lattice (i.e. double-periodic) is self imaging if only its base vectors and the angle enclosed by them satisfy certain rationality conditions. In order that an optical waveguide shall be self imaging it is therefore primarily necessary that its walls be so arranged that they image the waveguide cross section by ever repeated reflections in a regular two-dimensional lattice. This requirement determines the symmetry characteristics of all possible waveguide cross sections. By suitable choice of the absolute dimensions a self imaging waveguide is always produced.

The most general possible cross sectional shapes will therefore be produced if from the total of all 17 two-dimensional space groups (C. Kittel, Introduction to Solid State Physics, 2nd Edition, Wiley, New York (1956) pages 10–15) there are first of all eliminated those groups, among whose symmetry elements there occur no mirror lines, or only a single system of such parallel mirror lines. In the remaining space groups the mirror lines form line systems, as are shown, for example, in FIGS. 36–39. These lines divide the yz plane into fields of equal size. There must also be eliminated the space groups, in which within the fields there are found any sort of axes of rotational symmetry. After this has been done there remain the following five space groups: p2mm, p4, p4mm, p3ml and p6mm. In each of these groups it is then possible to insert along the chosen mirror lines actual mirrors serving as walls of a waveguide, which mirrors then produce the complete lattice of the particular form. In order that the mirrors shall actually form a two-dimensional conducting waveguide, the selected mirror lines must naturally form a closed line path.

Figure 36:
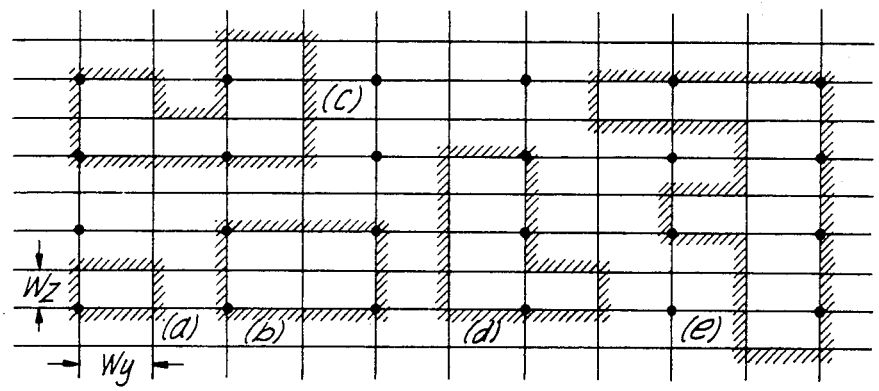

In FIG. 36 there is illustrated the described method for the space group p2mm. The grid points are marked by a dot, and the lines which are emphasised by hatching are the mirror lines. Consider first only FIG. 36(a). Here there are four mirrors which are so arranged that they form a rectangular waveguide whose edge lengths are $W_y$ and $W_z$. As already demonstrated, the condition for the self imaging of the particular rectangular grid is that its base vectors stand in a rational relationship to each other. Accordingly the following must apply $$\frac{W_z}{W_y} = \frac{r_y}{r_z} \qquad (37)$$

in which $r_y$ and $r_z$ are integers having no common divisor. Evidently this means that the rectangular cross section must be completely divisible into equal squares. For example, the cross section according to FIG. 36(a) has an edge ratio of 1:2. By satisfying the condition according to equation (37), the first erect self imaging is effected over the distance $$L_2 = 8n_f r_y r_z W_y W_z / \lambda \qquad (38)$$

Further erect self images are situated at all multiples of this length. In order to come to a formal conclusion upon the one-dimensional self imaging $L_1$ and $L_h$ are defined as follows. $L_1 = L_2/2$ and $L_h = h.L_1$. It is then possible to establish that waveguides of the smallest possible cross sectional shape (FIG. 36(a)) when effecting self imaging with integral even values of $h$ will deliver no beam division, but will effect simple imaging. In the case of odd integral values of $h$ it is possible to provide inverted imaging or beam division. However, for fractional rational values of $h$, according to the above stated theory, multiple imaging and beam division will definitely occur in close analogy with the one-dimensional case. The same applies, as will be demonstrated, for waveguides with cross sections according to FIGS. 37, 38 and 39.

More general beam dividing cross sectional forms are also possible. In FIGS. 36(b–d) mirrors are so inserted along other mirror lines that larger cross sections are formed than in the case of FIG. 36(a). These larger cross sections therefore contain reflecting straight portions internally. The straight portions divide the total cross section into a (small) number Q of fields of dimensions $W_y \times W_z$.

The repeated reflections of the waveguide cross section in its walls produce a two-dimensional lattice, which in the general case is identical with the original one. In special cases [in particularly simple cross sectional shapes for example FIG. 36(b)], the new lattice can also have larger lattice constants than the original one, but in such a case the larger cross section is not really a more general form and requires no fresh consideration. In respect of the remaining actually more general cross sections (FIGS. 36(c–e)) the self imaging and beam dividing properties will be understood by a consideration of the following two cases:

(a) The object to be imaged may at the position $x=0$ fill the entire waveguide cross section, and its light distribution in the individual fields may possess symmetry corresponding to the mirror lines. The lattice produced by the reflections will then be self imaged at the intervals $L_2$, $L_4$, $L_6$. The image fills all of the fields of the output plane and is identical with the object. When imaging with an odd value of $h$ the image can be laterally displaced in $y$ and $z$ direction by one half of the lattice constant. However, on account of the postulated symmetry of the object this displacement is here equivalent to a reversal of each individual field (rotation through 180° about its centre point). The waveguide images the described special object singly in each case with an integral value of $h$.

(b) The object may occupy only one of the fields of the plane at $x=0$, whilst the other $(Q-1)$ fields of the waveguide cross section are dark. These represent a disturbance in the virtual two-dimensional lattice produced by the reflections. This disturbance is, however, relatively slight, because in the total external space of the waveguide cross section ("almost everywhere") the lattice is perfect. Accordingly this disturbed lattice produces practically the same self images as the object described under paragraph (a). The fact that the mentioned disturbance is slight is known from experiments with double periodic objects (H. Dammann et al, Applied Optics 10, (1971) page 1454). In the present case therefore the single one of the occupied object fields is imaged on all the Q fields in the image plane $x=L_h$ ($h=$ an integer). This constitutes a two-dimensional imaging Q-fold beam division method, which functions completely analogous with the already described one-dimensional imaging method. For example if two different objects are brought into two of the input fields of a waveguide according to FIG. 36(c), there will appear in the plane $x=L_2$ mirror-symmetrical images, each consisting of the superposition of the images of both objects.

Figure 38:
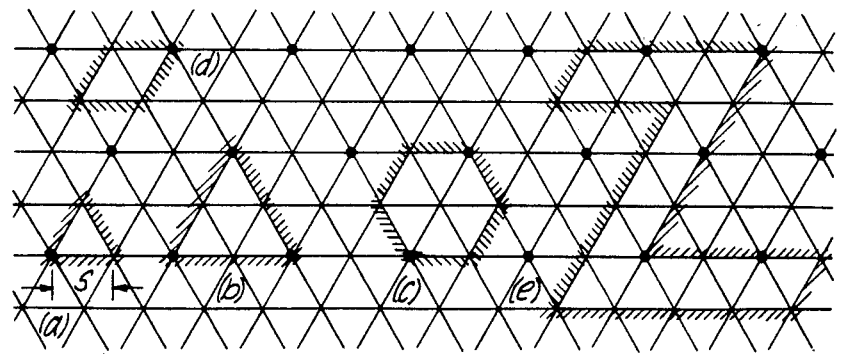
Figure 39:
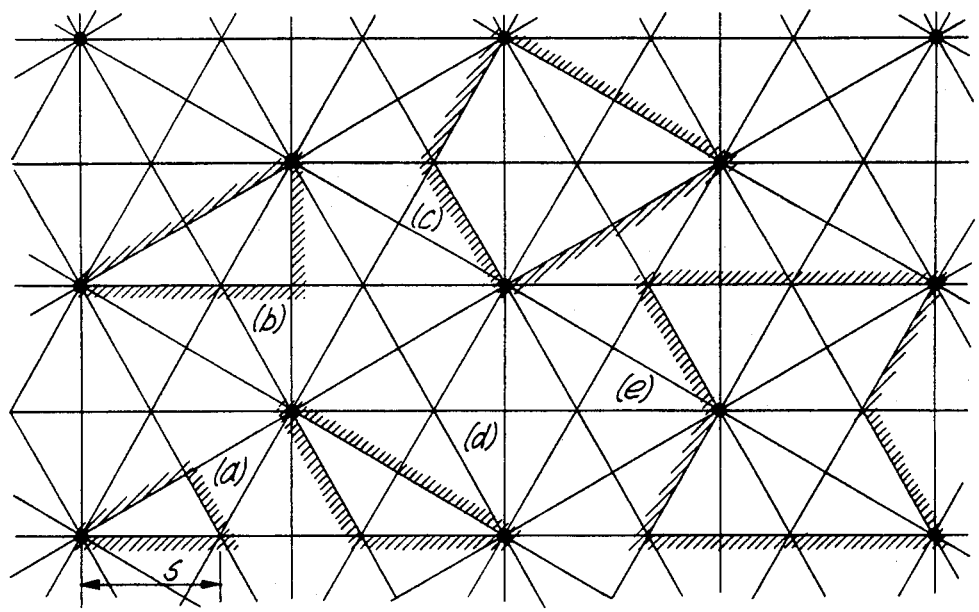

Similarly to the cross sectional shapes shown in FIG. 36, which are all derived from the space group p2mm, there are further cross sectional shapes in the other named space groups. These are included in FIGS. 37–39. The space group p4 (quadratic symmetry) is in this case not separately illustrated because it is a special case $(W_y=W_z)$ of FIG. 36. The FIGS. 37(a), 38(a) and 39(a) correspond to the conditions in FIG. 36(a) in so far as they show the smallest possible cross section of the particular symmetry type. The shortest length for erect self imaging is given for all these cross sections by equation (1) with the value $h=2$. For the cross section forms according to FIGS. 38 and 39 the equivalent thickness of the waveguide is to be inserted in equation (1).

$$W_{eq} = (9/8)^{1/2} S + 2D_{GH} \tag{39}$$

wherein S indicates the edge lengths of the triangular cross section shown in FIGS. 38 and 39, and $D_{GH}$ the penetration depth following from the Goos-Hahnchen effect (which in most cases can be neglected).

Figure 37:
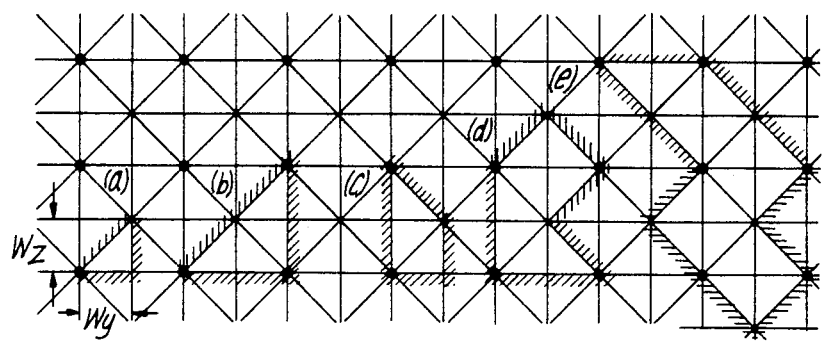

The more general cross sectional shapes indicated by (b),(c),(d) and (e) in FIGS. 37–39, are derived from the cross sections indicated by (a) in the same manner as described in FIG. 36. Each single complete surface of these figures, which is bordered only by the indicated reflecting straight portions, is suitable as the cross section on a self imaging waveguide. If the surface consists of Q-fields, then the respective waveguide performs in general a Q-fold two-dimensional image-conserving beam division process, if its length is equal to the self imaging length of the appertaining simplest cross section in accordance with equations (1) and (39) when $h$ is chosen as an even number. If $h$ has odd and rational fractional values, the multiplicity of the beam division is even greater.

In comparison to the conditions in one-dimensional beam dividing waveguides there appears to exist a contradiction in that beam division appears in this case even with an integral value of $h$, whilst in the one-dimensional case $h$ had to be a fraction. This contradiction is, however, fallacious. In the one-dimensional case $h$ was referred to the self imaging length of the layer type waveguide itself, but in the more general cross sectional shapes now being discussed, $h$ refers always to the associated smallest cross sectional shape which is indicated by (a) in FIGS. 36–39. For example the cross section according to FIG. 36(a) when $W_y=2W_z=2W$ in accordance with equation (38), produces its first self imaging ($h=1$) at the length $L_a=16n_fW^2/\lambda$. On the other hand, according to FIG. 36(b) $W_y=4w_z=4W$ and the length for its first single self imaging process is $L_b=64n_fW^2/\lambda$. Because the condition was imposed that the length of the more generalised waveguide according to (b) was equal to the length $L_a$ of the associated simplest cross section, the waveguide according to (b) was in fact operated under the condition $L_a/L_b=1/4$, that is to say with a fractional value $h$, when this case is referred to its own self imaging length $L_b$.

18. Beam division with other types of waves

Formerly only electromagnetic volume waves were considered. In accordance with the above stated theoretical basis self imaging waveguides and the applications depending thereon are possible also for other types of waves, which are propagated according to laws of geometrical optics, whether it be 3-dimensional (i.e. volume waves) or 2-dimensional (i.e. as surface waves). Among these are waves with an electromagnetic energy content such as surface plasmons and polaritons on metallic or dielectric materials, spin waves, plasma waves, as well as waves of a non-electromagnetic nature: acoustic pressure waves and shear waves, acoustic surface waves, gravity waves on the surface of liquids, and finally the "de Broglie" waves associated with particle rays (electrons, neutrons and so on). In the case of sound waves, for example, there will be introduced in place of light frequency, light wavelength, and light velocity, the terms sound frequency, sound wavelength $\lambda$ and sound velocity $v$, and in place of the optical refractive index there can be used for sound the reciprocal value $1/v$ of the sound velocity $v$. Moreover the decomposition of a wave field into a sum of orthogonal modes is likewise possible in the case of sound as it is in the case of light. For these reasons there will apply also the law stated by equation (1) to self imaging by means of a waveguide for sound waves in solid, liquid and gaseous media.

An imaging waveguide 143 for sound waves comprises, in accordance with FIG. 40, a layer, or a rectangular prism, of a material which is acoustically transparent, i.e. has a small sound absorption. Metals also come into consideration as conducting materials for sound waves. A waveguide which is based upon total reflection is surrounded externally with other acoustic materials, which possess higher sound velocities ($v_0$ and $v_2$) than the guide material ($v_1$). Instead of this relationship it will suffice if the acoustic impedances of the waveguide material and the surroundings differ markedly from each other, for example as it will in the case of a solid waveguide in a gaseous surrounding. In FIG. 40 there is shown an imaging acoustic wave-guide in cross section, which images a sound source A (object) as a "sound-image" A', which is utilised by some further device such as, e.g. a detection device 144. If $V(x,z)$ is called the local sound amplitude, (i.e. the maximum particle deflection) then it is possible as it is in the case of light, to represent a general sound field corresponding to the sound amplitudes V(x,z) in the waveguide according to equation (5) as a superposition of a number of simultaneously established modes of the waveguide. The mode function for compression waves and for the two possible types of polarisation of shear waves differ slightly from each other and from the mode functions of light. The differences can be attributed mainly to the different penetration depth D of the sound into the acoustically thinner materials, in which respect it is known that there is also a difference in the case of TE-polarised light and TM-polarised light. Given a sufficient thickness $W_z$ of the layer ($W_z \gg \lambda$) there will apply for the lowest modes in each case $D \ll W_z$, and the modes of the waveguide and the imaging conditions will be stated by the equations (12), (13), (15), (17) – (20) and by equation (1). For reasons of analogy; there will then be valid also for sound waveguides all of the above stated considerations connected with resolution, phase correction, tolerances, two-dimensional imaging, waveguide stacks and bundles, modification of the end faces, imaging with shortened waveguides, apodization and magnified and reduced images. Furthermore an imaging system corresponding to that of FIG. 11 is possible with acoustic surface waves.

As the simplest example there may be mentioned a two-dimensional imaging rectangular acoustic strip form waveguide. This is self supporting and is made of fused quartz. Its cross section is square being 2mm × 2mm, and its length is L=200mm. This guide produces a reversed image ($h_y = h_z = l$) of its end faces one upon the other for a sound wavelength of about $\lambda = 80\mu m$, which, in the case where compression waves are used, corresponds to a sound frequency of about 75 MHz. In the case where there are ten modes contributing structurally to the image, a spatial resolution of $r = 0.2$mm is to be expected.

I claim:

1. An imaging system for the at least one-dimensional self imaging of an object comprising a waveguide of layer form with reflecting boundary surfaces, wherein the distance L between the object and the image measured along the axis of the waveguide, at least one quantity $W_{eq}$ representing the inverse root-mean-square average transverse dimension of the guide measured along the imaging dimension, the effective index of refraction $n_1$ and the wavelength $\lambda$, satisfy the imaging condition $$L\lambda = 4hn_1 W^2_{eq}$$

separately for each imaging dimension, wherein in the case of single imaging $h$ is an integer and in the case of multiple imaging is a rationale fractional number, said waveguide having on its boundary faces thin phase-correcting layers (41) of dielectric material and having a rectangular cross-section whose transverse dimensions in the object and image planes relate to each other as the desired image magnifications along each imaging dimension.

2. An imaging system for the at least one-dimensional self imaging of an object having a waveguide of prismatic form with reflecting boundary surfaces, wherein the distance L between the object and the image measured along the axis of the waveguide, at least one quantity $W_{eq}$ representing the inverse-root-mean-square average transverse dimension of the guide measured along the imaging direction, the effective index of refraction $n_1$ of the waveguide material, and the wavelength $\lambda$, satisfy the imaging condition $$L\lambda = 4hn_1 W^2_{eq}$$

separately for each imaging dimension, in which $h$ is a rationale fractional number, and further comprising a number of optical waveguides (G FIG. 34) applied with their end faces against the end face of the first mentioned waveguide, whose other end face is reflecting, the arrangement being such that the end faces of each of the individual waveguides are imaged upon the end faces of all the other waveguides, said waveguide having a rectangular cross-section whose transverse dimensions in the object and image planes relate to each other as the desired image magnifications along each imaging dimension.

3. An imaging system for the at least one-dimensional self imaging of an object comprising a waveguide with reflecting boundary surfaces, two of which slope toward each other and intersect at least one other boundary surface wherein the distance L between the object and the image measured along the axis of the waveguide, at least one quantity $W_{eq}$ representing the inverse-root-mean-square average transverse dimension of the guide measured along the imaging direction, the effective index of refraction $n_1$ and the wavelength $\lambda$, satisfy the imaging condition $$L\lambda = 4hn_1 W^2_{eq}$$

separately for each imaging dimension, wherein, in the case of single imaging $h$ is an integer and in the case of multiple imaging is a rationale fractional number, said waveguide having the maximum number of the individual modes counted along a direction corresponding to the width $W_{eq}$ limited to a value which corresponds to the quotient of the transverse dimension $W_{eq}$ and the desired spatial resolution (r) of the system, but smaller than the number of the parallel node planes of the highest possible modes, said wavelength having a rectangular cross-section whose transverse dimensions in the object and image planes relate to each other as the desired image magnifications along each imaging dimension.

4. An imaging system for the at least one-dimensional self imaging of an object comprising a waveguide with reflecting boundary surfaces, two of which slope toward each other and intersect at least one other boundary surface, wherein the distance L between the object and the image measured along the axis of the waveguide, at least one quantity $W_{eq}$ representing the inverse-root-mean-square average transverse dimension of the guide measured along the imaging direction, the effective index of refraction $n_1$ and the wavelength $\lambda$, satisfy the imaging condition $$L\lambda = 4hn_1 W^2_{eq}$$

separately for each imaging dimension, wherein in the case of single imaging $h$ is an integer and in the case of multiple imaging is a rationale fractional number, said waveguide having on its boundary faces thin phase-correcting layers (41) of dielectric material, said waveguide having a rectangular cross-section whose transverse dimensions in the object and image planes relate to each other as the desired image magnifications along each imaging dimension.

5. An imaging system for the at least one-dimensional self imaging of an object comprising a waveguide with reflecting boundary surfaces, two of which slope toward each other and intersect at least one other boundary surface, wherein the distance L between the object and the image measured along the axis of the waveguide, at least one quantity $W_{eq}$ representing the inverse-root-mean-square average transverse dimension of the waveguide taking into account the effective index of refraction $n_1$ of the waveguide material, and the wavelength λ, satisfy the imaging condition $$L\lambda = 4hn_1 W^2_{eq}$$

separately for each imaging dimension, in which $h$ is a rationale fractional number, and further comprising a number of optical waveguides (G FIG. 34) applied with their end faces against the end face of said first mentioned waveguide, whose other end face is reflecting, the arrangement being such that the end faces of each of the individual waveguides are imaged upon the end faces of all the other waveguides, said waveguide having a rectangular cross-section whose transverse dimensions in the object and image planes relate to each other as the desired image magnifications along each imaging dimension.

6. An imaging system for the at least one-dimensional self imaging of an object comprising a waveguide of layer form with reflecting boundary surfaces, wherein the distance L between the object and the image measured along the axis of the waveguide, at least one quantity $W_{eq}$ representing the inverse-root-mean-square average transverse dimension of the guide measured along the imaging direction, the effective index of refraction $n_1$ and the wavelength λ, satisfy the imaging condition $$L\lambda = 4hn_1 W^2_{eq}$$

separately for each imaging dimension, wherein, in the case of single imaging $h$ is an integer and in the case of multiple imaging is a rationale fractional number, said waveguide having the maximum number of the individual modes counted along a direction corresponding to the width $W_{eq}$ limited to a value which corresponds to the quotient of the transverse dimension $W_{eq}$ and the desired spatial resolution (r) of the system and having a rectangular cross-section whose transverse dimensions in the object and image planes relate to each other as the desired image magnifications along each imaging dimension.

7. An imaging system according to claim 6, characterized by the feature that at least one of the boundary surfaces of the waveguide is formed by a weakly light absorbant material.

8. An imaging system according to claim 6 including irradiating optical equipment having an aperture, characterized by the feature that for the purpose of limiting the number of established modes the aperture is reduced.

9. An imaging system according to claim 6, characterized by the feature that for the purpose of limiting the number of received modes there is arranged at a distance behind the image (A′) imaged by the waveguide (93) a diaphragm (91) which filters out the undesirably high disturbing modes.

10. An imaging system according to claim 6, characterized by the feature that at a spacing distance behind the image (A′) imaged by the waveguide (93) there is arranged a mask, whose transparency reduces from the centre to the margin thereof and which filters out the undesirably high disturbing modes.

11. An imaging system for the at least one-dimensional self imaging of an object comprising a waveguide with reflecting boundary surfaces, wherein the distance L between the object and the image measured along the axis of the waveguide, at least one quantity $W_{eq}$ representing the inverse-root-mean-square average transverse dimesion of the guide measured along the imaging dimension, the effective index $N_\mu$ of the wave-guide material, and the wave-length λ, satisfy the imaging condition $$L\lambda = 4hN_\mu W^2_{eq}$$

separately for each imaging dimension, wherein $h$ in the case of single imaging is an integer and in the case of multiple imaging is a rationale fractional number, said waveguide having a rectangular cross-section whose transverse dimensions in the object and image planes relate to each other as the desired image magnifications along each imaging dimension.

12. An imaging system according to claim 11, characterized by the feature that for the purpose of coupling the light to the waveguide, the waveguide is provided at at least one end with an inclined surface (Sp in FIG. 35) and that the light enters and leaves through windows ($E_j$, $A_j$) situated substantially parallel to the longitudinal direction of the waveguide.

13. An imaging system as claimed in claim 11 in which the waveguide is provided on its boundary faces with partially reflecting absorbent metal layers (101).

14. An imaging system as claimed in claim 11 in which the cross-section of the wave guide is deformed at its boundary surfaces to produce a barrel shape of the order of magnitude of a wavelength.

15. An imaging system according to claim 11, in which the waveguide has a polygonal, non-quadratic cross-section which is completely divisible into a number of equilateral triangles of equal size.

16. An imaging system according to claim 11, in which the waveguide has a polygonal, non-quadratic cross-section which is completely divisible into a number of triangles of equal size having the angles 90°, 60°, and 30°.

17. An imaging system according to claim 11, in which the waveguide has a polygonal, non-quadratic cross-section which is completely divisible into a number of triangles of equal size having the angles 90°, 45°, and 45°.

18. An imaging system according to claim 11, in which the waveguide has a polygonal, non-quadratic cross-section which is completely divisible into a number of rectangles of equal size, the lengths of whose sides are related as the square roots of small integers.

19. An imaging system according to claim 11, characterized by the feature that a series of strip conductors are arranged in side by side relationship, each of which satisfies the imaging condition and whose width continually increases from one end face to the other end face and that the outwardly situated strip conductors ($S_a$) are somewhat wider than the more inwardly situated strip conductors ($S_i$).

20. An imaging system according to claim 11, characterized by the feature that the cross section of the waveguide (113) continuously varies in the propagation direction.

21. An imaging system according to claim 11, in which said waveguide is a layer form waveguide (133) having a thickness of the order of magnitude of the length of the light waves and is arranged upon a substrate (132) between two layer guides of an integrated optical arrangement.

22. An imaging system according to claim 11, characterized by the feature that for the purpose of cupling together two layer guides (132, 182') of an integrated optical arrangement situated upon a substrate (185), the waveguide (183) is arranged at the adjacent ends of said layer guides and is so dimensioned that the ends of the waveguides are mutually imaged upon each other so that an image of the ends is formed between the layer guides at a distance from the substrate (185).

23. An imaging system according to claim 11, characterized by the feature that the waveguide is a layer guide, whose thickness is substantially greater than the wavelength and that the image of a strip form input window ($E_1$) situated at one end of the layer guide is imaged at its other end upon each of a number ($q$) of strip form output windows ($A_1$, $A_2$, $A_3$ and $A_q$).

24. An imaging system according to claim 11, characterized by the feature that for the purpose of splitting an image into symmetrical and antisymmetrical components the length L of the waveguide is selected for a half-integral parameter $h$, and that a device (PS) for phase delay of the light through 90° is provided at an input window ($E_1$) in FIG. 31) taking up the one half of the input surface of the waveguide.

25. An imaging system according to claim 24, characterized by the feature that the waveguide is a layer type waveguide, which has a different thickness in the region (PS) of the input window ($E_1$) than in the other regions.

26. An imaging system according to claim 24, characterized by the feature that the phase shift device (PS) is an electrical delay element, whose phase shift is variable by external control.

27. An imaging system according to claim 24, characterized by the feature that the phase displacement device (PS) is a strip conductor, whose phase displacement is variable by external control.

28. An imaging system according to claim 11, characterized by the feature that there is provided a waveguide composed of at least three conductor sections, of which the first conductor section receives the image at an input window ($E_1$ in FIG. 33), which is imaged at at least two output windows ($A'_1$, $A''_1$) in the mutually adjacent second and third guide sections connected to the first guide section, that the widths ($W_z$, $W'_z$ and $W'''_z$ of the guide sections are in the relationship to each other $(q'+q''):q':q''$, wherein $q'$ and $q''$ are integers proportional to the intensities of the image at the two output windows, and that the lengths (L, L', L'') of the guide sections are so selected that when $p$, $p'$ and $p''$ are integers, their respective imaging parameters $h_z$, $h'_z$ and $h''_z$ satisfy the conditions $h_z=p/(q'+q'')$, $h'_z=p'/q'$ and $h''_z=p''/q''$.

29. An imaging system according to claim 28, characterized by the feature that between the input and output windows ($E_j$, $A_j$) which are associated with each other there are situated devices (PS) for phase shifting.

30. An imaging system according to claim 11, characterized by the feature that for the purpose of providing a crossover of strip waveguides there are connected to each of the two opposite end faces of a layer form self imaging waveguide (3) two mutually separated narrow strip conductors (1,2 and 1',2'), which supply and abstract the crossing information, and that the layer waveguide operates with an odd imaging parameter $h$.

31. An imaging system according to claim 30, characterized by the feature that for a very small width (W) of the self imaging waveguide its length satisfies the relation $$L = h(\lambda/2) |N_0-N_1|^{-1}$$

wherein $N_0$ and $N_1$ are the effective refractive indexes of two modes capable of existing over the width (W) of the waveguide.

32. An imaging system according to claim 11, characterized by the feature that the waveguide comprises a stacked series of layer conductors (51) with polygonal cross section, which are separated from each other by dielectric or metallic intermediate layers (52) and each has a transverse dimension satisfying the quantity $W_{eq}$.

33. An imaging system according to claim 32, characterized by the feature that the waveguide (123) extends in the form of a wedge and contains fluid transparent material and that its boundary surfaces (124, 125) are relatively movable for varying the magnification or reduction ratio.

34. An imaging system according to claim 11, in which said waveguide is a layer form, and further comprising a layer conductor (162), said waveguide (163) together with said layer conductor (162) of an integrated optical arrangement so arranged upon a common substrate and adjacent a light amplifier (161) that it mutually images upon each other the end face (169) of the layer guide and the end face (168) of the active zone of the amplifier.

35. An imaging system according to claim 34, further comprising a cover plate (167) for the waveguide (163), said plate comprising a material having the same refractive index as a substrate (165) of the layer conductor (162).

36. An imaging system according to claim 11, in which said waveguide is of layer form characterized by the feature that the refractive index of the waveguide material in the direction $y$ normal to the layer plane follows such a general function $n=n(y)$ that optical waves can be conducted along the layer, that the width of the wave conducting layer is limited to a strip of the dimension $W_{eq}$, and that the effective refractive index in the imaging condition is equal to the effective index $N_\mu=C/V_\mu$ of a mode in which the imaging is to take place and whose value is determined by the phase velocity of said mode $V_\mu$, wherein $c$ is the velocity of light in free space.

37. An imaging system according to claim 36, characterized by the feature that for the purpose of apodization there is a light absorbent material at the surface of the substrate at least at one of the side edges of the waveguide.

38. An imaging system according to claim 36, characterized at the feature that the waveguide is formed by the surface of a substrate over a width $W_z$ corresponding to the quantity $W_{eq}$ and that the refractive index contour in the substrate surface outside the region limited by the width $W_z$ is different from that within the waveguide region.

39. An imaging system according to claim 38, characterized by the feature that for the purpose of reducing image errors the refractive index is uniform over essentially the entire volume of the guide and is continuously varied over a thin region having a width of the order of one wavelength adjacent to at least one of the boundary surfaces of the guide.

40. An imaging system according to claim 11, characterized by the feature that the waveguide is a thin film guide, upon whose opposite end faces there are arranged side by side a number ($q$) of optical strip guides (SE, SA in FIG. 29) of small width ($W_1$).

41. An imaging system according to claim 40, characterized by the feature that the strip guides (SE, SA) are so dimensioned that they form, at the respective end face of the waveguide, an image of an object which is situated at said end.

42. An imaging system according to claim 40, characterized by the feature that the layer thickness (D) of the guides is so small that only a single mode exists in the normal dimension ($y$).

43. An imaging system according to claim 40, characterized by the feature that the width ($W_z$) of the waveguide permits the existence of a number of modes which is substantially greater than the number of image elements to be transmitted.

44. An imaging system according to claim 40, characterized by the feature that the widths ($W_1$) of the strip guides (SE, SA) permits the transmission of only a single mode.

45. An imaging system according to claim 40, characterized by the feature that the strip guides (SE, SA) are so dimensioned that they form at their end remote from the waveguide an image of light distribution which exists at the end face of said first waveguide.

46. An imaging system according to claim 40, characterized by the feature that there are connected at the one end face ($x=0$) of the waveguide at least a first input strip guide ($U_j$ in FIG. 30) and at least a second input strip guide ($V_j$), whose images are formed respectively at a first and a second output position ($S_j$ and $D_j$) at the other end face ($x=L$) of the waveguide, wherein the intensities of the images at the two output positions are related at least approximately in the ratio 1:1.

47. An imaging system according to claim 46, characterized by the feature that for the purpose of poducing logical connections (AND, OR etc.) light detectors are situated at the respective output positions ($S_j$, $D_j$), which light detectors are coupled to trigger circuits (T) which respond upon a threshold value being exceeded.

* * * * *